United States Patent
Shatek et al.

(10) Patent No.: US 10,079,526 B2
(45) Date of Patent: *Sep. 18, 2018

(54) ELECTRICAL POWER GENERATION SYSTEM WITH MULTIPLE PATH COOLING

(71) Applicant: Cummins Inc., Columbus, IN (US)

(72) Inventors: Nicholas W. Shatek, Cambridge, MN (US); Raghavendran Jayaraman, Blaine, MN (US)

(73) Assignee: Cummins, Inc., Columbus, IN (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/023,249

(22) PCT Filed: Sep. 26, 2014

(86) PCT No.: PCT/US2014/057864
§ 371 (c)(1),
(2) Date: Mar. 18, 2016

(87) PCT Pub. No.: WO2015/048549
PCT Pub. Date: Apr. 2, 2015

(65) Prior Publication Data
US 2016/0230654 A1    Aug. 11, 2016

Related U.S. Application Data

(60) Provisional application No. 61/883,751, filed on Sep. 27, 2013.

(51) Int. Cl.
*F02B 63/04* (2006.01)
*H02K 9/06* (2006.01)
(Continued)

(52) U.S. Cl.
CPC ............... *H02K 9/06* (2013.01); *F01N 1/00* (2013.01); *F01N 3/021* (2013.01); *F01N 3/20* (2013.01);
(Continued)

(58) Field of Classification Search
CPC ............ H02K 9/06; H02K 7/1815; H02K 9/04
See application file for complete search history.

(56) References Cited

U.S. PATENT DOCUMENTS

D217,240 S    4/1970 Holtkamp
4,136,432 A    1/1979 Melley et al.
(Continued)

FOREIGN PATENT DOCUMENTS

CN    201403017 Y    2/2010
EP    1612916 A1    1/2006
JP    3422022 B2    2/1994

OTHER PUBLICATIONS

International Search Report and Written Opinion issued in PCT/US2014/057855, dated Dec. 29, 2014, 13 pages.
(Continued)

*Primary Examiner* — Sean Gugger

(57) ABSTRACT

A genset has an enclosure in which a bulkhead separates the enclosure into a high pressure compartment and a low pressure compartment. A first fan is located in the high pressure compartment and draws ambient air into the high pressure compartment and pressurizes the high pressure compartment to a first pressure that is greater than ambient pressure. A radiator is located within the high pressure compartment such that the pressurized air in the high pressure compartment flows through the radiator and out of the high pressure compartment. A generator is located in the high pressure compartment and provides a gas flow path therethrough from the high pressure compartment to the low pressure compartment. An engine is located in the low pressure compartment and is coupled to the radiator for cooling and is coupled to the generator through the bulkhead to drive the generator.

31 Claims, 21 Drawing Sheets

(51) Int. Cl.
| | |
|---|---|
| *H02K 7/18* | (2006.01) |
| *F01N 13/08* | (2010.01) |
| *F01P 3/20* | (2006.01) |
| *F01P 11/04* | (2006.01) |
| *H02K 9/04* | (2006.01) |
| *F01N 1/00* | (2006.01) |
| *F01N 3/021* | (2006.01) |
| *F01N 3/20* | (2006.01) |
| *F01P 1/06* | (2006.01) |
| *F01P 5/02* | (2006.01) |
| *F04D 29/28* | (2006.01) |
| *F04D 29/32* | (2006.01) |
| *F02B 77/13* | (2006.01) |

(52) U.S. Cl.
CPC .......... *F01N 13/08* (2013.01); *F01P 1/06* (2013.01); *F01P 3/20* (2013.01); *F01P 5/02* (2013.01); *F01P 11/04* (2013.01); *F02B 63/042* (2013.01); *F02B 63/044* (2013.01); *F02B 77/13* (2013.01); *F04D 29/281* (2013.01); *F04D 29/325* (2013.01); *H02K 7/1815* (2013.01); *H02K 9/04* (2013.01)

(56) References Cited

U.S. PATENT DOCUMENTS

| | | | |
|---|---|---|---|
| 4,243,893 A | 1/1981 | Sten | |
| D266,235 S | 9/1982 | Hughes | |
| D279,977 S | 8/1985 | Bonazelli | |
| 4,608,946 A | 9/1986 | Tanaka et al. | |
| 4,647,835 A * | 3/1987 | Fujikawa | F02B 63/04 290/1 B |
| 4,733,750 A | 3/1988 | Poirier et al. | |
| 4,779,905 A * | 10/1988 | Ito | F02B 63/04 123/2 |
| 4,835,405 A | 5/1989 | Clancey et al. | |
| 4,907,546 A | 3/1990 | Ishii et al. | |
| 4,992,669 A | 2/1991 | Parmley | |
| 5,297,517 A | 3/1994 | Brandt et al. | |
| 5,433,175 A | 7/1995 | Hughes et al. | |
| 5,694,889 A | 12/1997 | Ball et al. | |
| 5,890,460 A * | 4/1999 | Ball | F01P 1/02 123/2 |
| 5,908,011 A * | 6/1999 | Stauffer | F02B 63/04 123/198 E |
| D416,858 S | 11/1999 | Domanski | |
| 6,006,731 A * | 12/1999 | Uzkan | F01P 7/165 123/41.29 |
| 6,028,369 A | 2/2000 | Hirose et al. | |
| 6,039,547 A | 3/2000 | Hendrix et al. | |
| 6,137,080 A | 10/2000 | Borchardt et al. | |
| 6,450,133 B1 | 9/2002 | Bernard et al. | |
| 6,491,133 B2 | 12/2002 | Yamada et al. | |
| D470,103 S | 2/2003 | Nishida | |
| 6,552,454 B2 | 4/2003 | Kern et al. | |
| 6,604,916 B2 * | 8/2003 | Lu | H05K 7/20581 361/695 |
| D480,359 S | 10/2003 | Yamada et al. | |
| 6,630,756 B2 * | 10/2003 | Kern | F02B 63/04 310/50 |
| D492,650 S | 7/2004 | Nishi | |
| 6,784,574 B2 | 8/2004 | Turner et al. | |
| D503,381 S | 3/2005 | Mizokami et al. | |
| 6,895,903 B2 * | 5/2005 | Campion | F02B 63/04 123/2 |
| D515,030 S | 2/2006 | Yasuda et al. | |
| 7,007,966 B2 | 3/2006 | Campion | |
| 7,081,682 B2 | 7/2006 | Campion | |
| D534,863 S | 1/2007 | Yasuda et al. | |
| 7,221,061 B2 | 5/2007 | Alger et al. | |
| 7,314,397 B2 | 1/2008 | Sodemann et al. | |
| D571,292 S | 6/2008 | Murata et al. | |
| D575,733 S | 8/2008 | Murata et al. | |
| 7,482,705 B2 | 1/2009 | Piercey, III | |
| 7,492,050 B2 * | 2/2009 | Brandenburg | H02K 9/06 290/1 B |
| 7,589,429 B2 | 9/2009 | Hunter | |
| 7,608,934 B1 | 10/2009 | Hunter | |
| 7,795,745 B2 | 9/2010 | Mellon et al. | |
| 8,196,555 B2 | 6/2012 | Ikeda et al. | |
| 8,207,621 B2 * | 6/2012 | Hunter | F02B 77/13 123/2 |
| 8,294,285 B2 | 10/2012 | Hunter | |
| 8,427,814 B1 | 4/2013 | Gonce | |
| D691,925 S | 10/2013 | Hindle | |
| 8,555,824 B2 | 10/2013 | Lobsiger | |
| 8,680,728 B2 | 3/2014 | Errera et al. | |
| D711,825 S | 8/2014 | Wilson et al. | |
| D729,736 S | 5/2015 | Matthews et al. | |
| 9,474,185 B2 * | 10/2016 | Jochman | H05K 7/20145 |
| 2004/0219079 A1 | 11/2004 | Hagen et al. | |
| 2006/0080971 A1 | 4/2006 | Smith et al. | |
| 2007/0132243 A1 | 6/2007 | Wurtele et al. | |
| 2007/0267870 A1 | 11/2007 | Ambrose | |
| 2008/0053129 A1 * | 3/2008 | Follette | B60H 1/00371 62/244 |
| 2008/0129053 A1 | 6/2008 | Piercey | |
| 2011/0114036 A1 | 5/2011 | Radtke et al. | |
| 2011/0115235 A1 * | 5/2011 | Steffl | H02P 9/04 290/1 B |
| 2011/0248511 A1 | 10/2011 | Marlenee et al. | |
| 2013/0314872 A1 | 11/2013 | Kawakita et al. | |
| 2014/0209045 A1 | 7/2014 | Hibi et al. | |

OTHER PUBLICATIONS

International Search Report and Written Opinion issued in PCT/US2014/057864, dated Dec. 29, 2014, 13 pages.

* cited by examiner

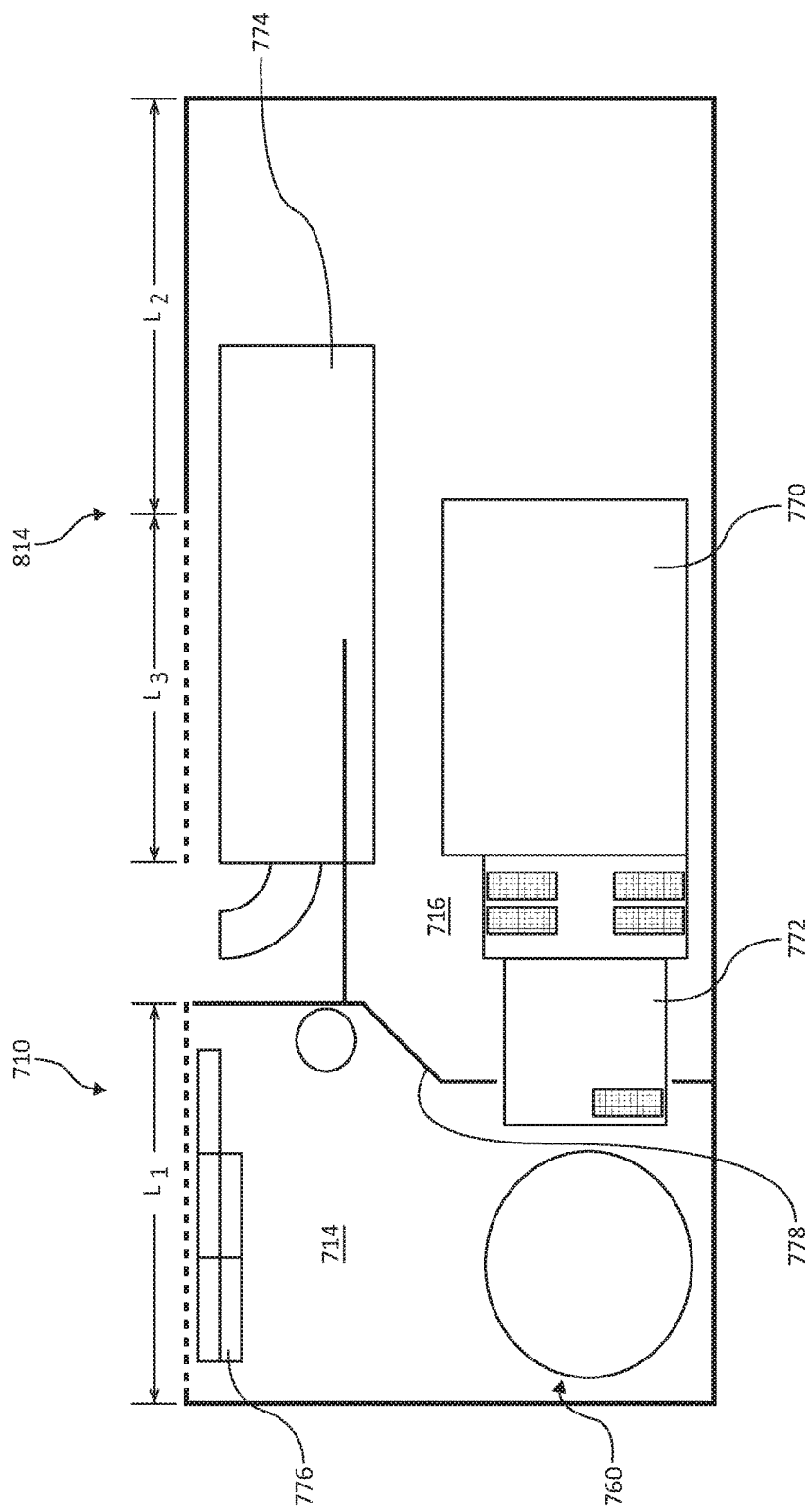

ELECTRICAL POWER GENERATION SYSTEM WITH MULTIPLE PATH COOLING

CROSS-REFERENCE TO RELATED APPLICATIONS

This application is a national phase application of PCT Application No. PCT/US2014/057864, internationally filed on Sep. 26, 2014, titled "ELECTRICAL POWER GENERATION SYSTEM WITH MULTIPLE PATH COOLING," which claims priority to U.S. Provisional Patent Application No. 61/883,751, filed Sep. 27, 2013, titled "ELECTRICAL POWER GENERATION SYSTEM WITH MULTIPLE PATH COOLING," both of which are incorporated herein in their entirety for any purpose.

TECHNICAL FIELD

The invention relates generally to electrical power generators.

BACKGROUND

An electrical power generation system, frequently known as a genset, typically includes a generator, such as an alternator, driven by a diesel or other internal combustion engine. The generator components are typically packaged within an enclosure. Genset implementation varies, including both mobile and stationary applications, primary and standby/backup power, controlled and uncontrolled environments and the like.

In many applications it is desired that the genset operate outdoors, being able to tolerate environmental extremes of temperature, humidity, precipitation, and the like. Alternatively or additionally, there is often a desire to minimize noise emanating from the genset, while maintaining a sufficiently small genset form factor, to improve genset efficiency, maintainability, reliability, and/or manufacturability, and to provide operator-friendly input/output genset interfacing. There is an ongoing desire for further improvements in genset performance.

BRIEF DESCRIPTION OF THE FIGURES

FIGS. 19-21 are schematic illustrations of the electrical power generation system of FIGS. 17-18, showing modular configurations in accordance with embodiments of the present invention.

Figure 1:
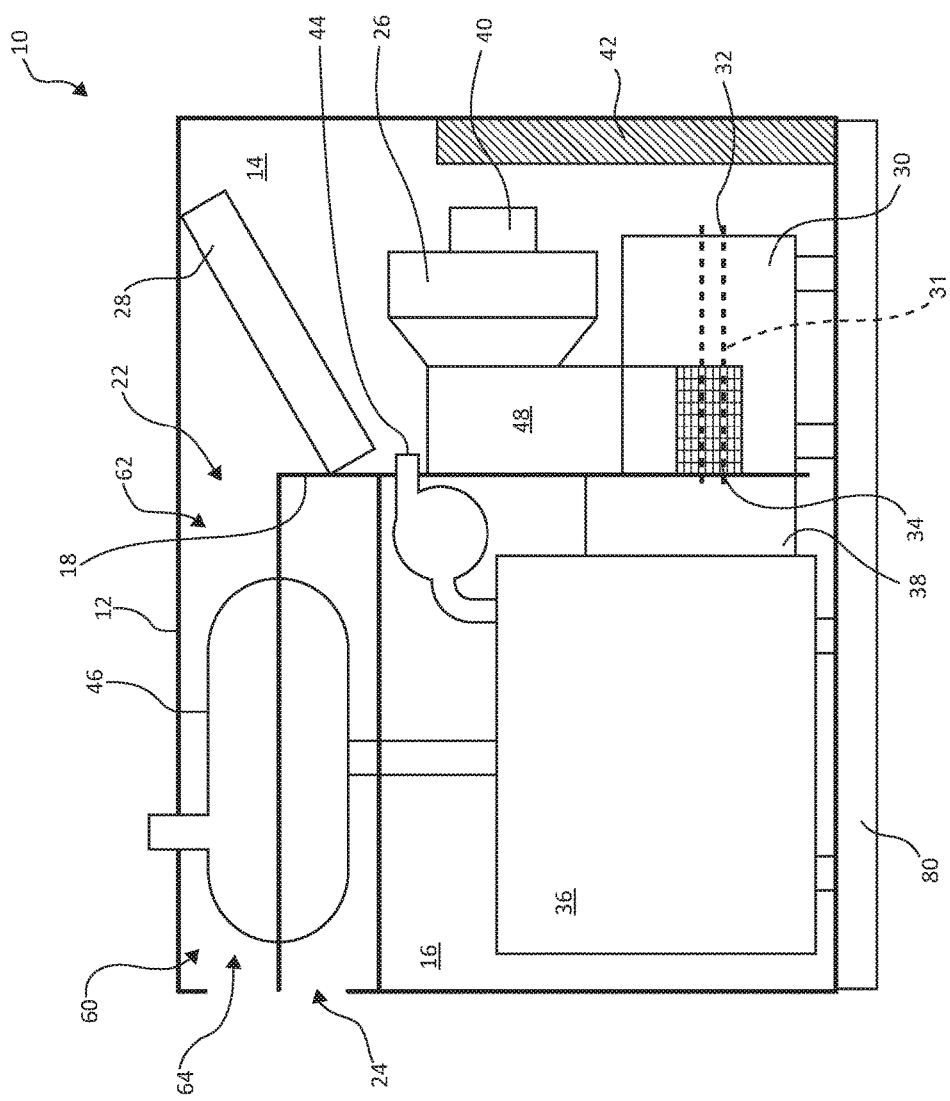
FIG. 1 is a schematic illustration of an electrical power generation system in accordance with embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The present invention pertains generally to electrical power generation systems in accordance with embodiments of the invention. Conventional generator enclosures are typically simple box shapes that enable ease of shipping and modest on-site protection from the environment. Some embodiments of generator sets utilize the enclosure as a box-shaped wind tunnel, with air being brought in one end by a low pressure radiator fan and driven by the alternator, engine and radiator to cool each in turn before exiting the enclosure at the opposite end. Baffling on the air intake and discharge may be limited to placement on the open enclosure ends in this arrangement, which may result dust and water exclusion issues and noise transmission issues. Furthermore, air flows being driven by low pressure sources, such as conventional axial radiator fans, may further limit the utilization of baffling, restriction, multiple air flow paths, or convoluted ducting while remaining effective for the requirements of the generator set.

FIG. 1 is a schematic illustration of an electrical power generation system 10 according to some embodiments of the disclosure. For the sake of simplicity, the electrical power generation system 10 will subsequently be referred to as the genset 10. As illustrated, the genset 10 includes an enclosure 12 that at least partially isolates internal components of the genset 10 from an ambient environment having, for example, an ambient pressure. The enclosure 12 may be configured to protect the genset 10 from environmental factors such as wind, precipitation and temperature extremes, and to provide a structure enabling the transport of the genset 10. While embodiments of the present invention are described in relation to electrical power generation system or genset enclosures, it is noted that other engine enclosures outside of electrical power production are contemplated and include, but are not limited to, hydraulic power generation, mechanical power generation, or pumping. Some applications are stationary, while others are mobile or semi-mobile (e.g., a ship powerplant or a train powerplant).

The enclosure 12 is divided into a first or generator compartment 14 and a second or engine compartment 16 via a bulkhead 18. As described in greater detail below, during operation of the genset 10, a first relatively high pressure with respect to the ambient pressure outside the enclosure 12 can be created within the alternator compartment 14 (i.e. a high pressure compartment, air handling compartment, or cooling compartment). A second elevated pressure with respect to the ambient pressure is created within the engine compartment 16. In embodiments of the invention, the first relatively high pressure in the alternator compartment 14 is a higher pressure than the second relatively high pressure in the engine compartment 16. The high pressure compartment 14 includes an inlet region 20 and an outlet region 22. The low pressure compartment 16 includes an outlet region 24. Inlet region 20 provides for the entry of ambient air through enclosure 12 and into the generator compartment 14. Air within the generator compartment 14 can exit enclosure 12 through the outlet region 22. Air within the engine compartment 16 can exit enclosure 12 through outlet region 24.

A first fan 26 and a radiator 28 are located in the high pressure compartment 14. In some embodiments, as illustrated, the high pressure inlet region 20 is fluidly coupled to a baffle or snorkel duct 48 through which air from the high pressure inlet region 20 is provided to a region proximate the first fan 26. The baffle or snorkel duct 48, if present, can reduce noise transmitted from the interior of the enclosure. In some embodiments, while not expressly illustrated, the high pressure inlet region 20 may optionally include flaps or other structure that can be moved to regulate air flow through the high pressure inlet region 20. In some embodiments, having flaps on the inlet and outlet ports can additionally allow for environmental sealing. For example, this could be to prevent water or dust intrusion when the genset is not operating or in transit, or utilized as part of a "cold weather kit" to maintain heat in the interior of the enclosure or the engine compartment 16 from an auxiliary heater.

An engine 36 is shown in the engine compartment 16. The engine 36 is mechanically connected to the generator 30 through the bulkhead 18. In the illustrated embodiment, the high pressure compartment 14 and the low pressure compartment 16 are generally horizontally spaced from one another with respect to a base 80 of the enclosure 12. The low pressure outlet region 24 is above the engine 36 with respect to the base 80 of the enclosure 12 in the illustrated embodiment. In the illustrated embodiment, the radiator 28 is generally located above the first fan 26 with respect to the base 80 of the enclosure, and the fan 28 rotates about an axis that is generally parallel to the base 80. These features can be configured differently in other embodiments of the invention. For example, the radiator 28 can be located elsewhere, relative to the first fan 26, within the high pressure compartment 14 or otherwise in fluid communication with the high pressure compartment 14, for example, coupled by ducting.

The first fan 26 draws gas such as air into the high pressure compartment 14 through the high pressure inlet region 20 and pressurizes the gas in the high pressure compartment 14 to a first pressure that is greater than an ambient pressure outside of the enclosure 12. In some embodiments, the first fan 26 pressurizes the gas inside the high pressure compartment 14 to a pressure that is in the range of about 4 inches water column to about 12 inches water column. In some embodiments, weep or drain holes are provided to allow for water or liquid drainage in one or all of the bottom of the high pressure compartment, the air inlet snorkel duct 48, the outlet regions 64, 24 (i.e. air discharges), and the low pressure compartment 16.

In some embodiments, the first fan 26 includes, but is not limited to, an axial, a centrifugal or a mixed flow fan. The first fan 26 may also be an electric motor, direct mechanical, belt driven, or hydraulically driven fan. In some instances, the genset 10 can include an electric motor 40 to drive the first fan 26. In some embodiments, as illustrated, the electric motor 40 is disposed within the high pressure compartment 14. In other embodiments (not shown), the motor 40, the first fan 26 and/or the radiator 28 are located in other areas outside of the high pressure compartment 14 and in fluid communication by ducting or other means to couple to the high pressure compartment 14. In yet other embodiments, the fan is constant speed, is continuously variable in speed, or has discrete selectable operating speeds and/or flow rates. Air flow and pressure may also be regulated manually or actively in embodiments of the present invention through the use of duct restrictions or flaps.

In some embodiments, the genset 10 has a control box 42 that includes a fan control system that is coupled to the first fan 26 and/or the motor 40. In some embodiments, the fan control system is configured to operate the first fan 26 at one of several different speeds, depending upon the cooling needs. In other embodiments, the control box 42 has an air inlet coupled to the high pressure compartment 16 and outlet coupled to the ambient environment to allow for a cooling airflow through the control box 42. In yet other embodiments, genset controls, paralleling gear, and connection terminals are also located in the control box 42. It is further noted that the control box 42 being located at an end of the genset enclosure 12 facilitates service and access to the control box 42 through access panels (not shown) through the enclosure 12 end wall. Examples of control operators and control algorithms that can be used in connection with the genset 10 can be found in U.S. Publication No. 2011/0248511 A1, the entire contents of which are hereby incorporated by reference herein for all purposes.

The radiator 28 is disposed in the high pressure compartment 14 between inlet region 20 and outlet region 22. In the embodiment shown, the radiator is positioned at a location that is adjacent the high pressure outlet region 22. The pressurized gas within the high pressure compartment 14 flows through the radiator 28 and flows out of the high pressure compartment 14 through the high pressure outlet region 22. The pressurized gas that flows through the radiator 28 is relatively cool, as the pressurized gas has not been pre-heated by flowing through or across any heated components within the genset 10 such as the engine 36.

The generator 30 can include a gas flow path 31 through the generator 30 that permits gas to flow between and around the stators and rotor of the generator 30, thereby cooling the generator 30. The gas flow path 31 through the generator 30 extends from an inlet region opening 32 located in the high pressure compartment 14 to an outlet region opening 34 that extends through the bulkhead 18 into the low pressure compartment 16. The engine 36 is coupled to the radiator 28 for cooling the engine 36. It is noted that in alternative embodiments, the generator 30 does not penetrate the bulkhead 18, while in others it is through bulkhead 18 and partially in both compartments, while in yet others the generator 30 is in the high pressure compartment 14 and only a coupling shaft penetrates the bulkhead 18.

In some embodiments, as illustrated, the genset 10 includes a second fan 38 to pressurize the low pressure compartment 16. The second fan 38 is located in the low pressure compartment 16 in the illustrated embodiment and may be disposed between the generator 30 and the engine 36. In some embodiments, the second fan 38 is part of the generator 30 and thus is driven by the engine 36 as the generator 30 is driven by the engine 36. In some embodiments, the second fan 38 is a centrifugal fan. In other embodiments, the second fan 38 is optional or located outside of the low pressure compartment 16. It is noted that in alternative embodiments of the present invention the gas flow path from the high pressure compartment 14 through bulkhead 18 into the low pressure compartment 16 passes through ducts in bulkhead 18.

The second fan 38 draws gas into the low pressure compartment 16 through the generator outlet region opening 34 and pressurizes the gas in the low pressure compartment 16 to a second pressure. In some embodiments of the invention the second pressure is less than the first pressure but greater than the ambient pressure. In some embodiments, the second fan 38 pressurizes the gas in the low pressure compartment 16 to a pressure that is in the range of about 0 inches water column to about 4 inches water column. The pressurized gas in the low pressure compartment 16 flows out of the low pressure compartment 16 through the low pressure outlet region 24. Air used to cool the generator 30 and other air within the low pressure compartment 16 is thereby forced out of the enclosure 12.

In some embodiments, the high pressure compartment 14 is substantially sealed with respect to the ambient pressure environment (e.g., no substantial air flow openings other than those resulting from manufacturing variances and tolerances) except for the high pressure inlet region 20 and the high pressure outlet region 22. In some embodiments, the low pressure compartment 16 is substantially sealed with respect to the ambient pressure environment except for the low pressure outlet region 24. In some embodiments, the bulkhead 18 substantially seals the high pressure compartment 14 from the low pressure compartment 16 except for the generator gas flow path. Other embodiments of the genset 10 have other gas inlets and outlets into and/or out of the high pressure compartment 14 and/or the low pressure compartment 16.

In some embodiments, the engine 36 can be turbocharged while in other embodiments the engine 36 is naturally aspirated. In some embodiments, a combustion air inlet 44 pulls relatively cool and pressurized gas from the high pressure compartment 14 to provide the engine 36 with combustion air. It will be appreciated that relatively cooler air is denser, and thus there are performance advantages to providing the engine 36 with relatively cool combustion air. The engine 36 is also coupled to an optional exhaust aftertreatment system 46 that serves to quiet and clean the combustion gases exiting the engine 36. In other embodiments the combustion air inlet 44 can open into the ambient environment through the enclosure 12.

In some embodiments, as will be discussed in greater detail below, the exhaust aftertreatment system 46 may be bathed in relatively cooler gases exiting the high pressure compartment 14. In some instances, the exhaust system 46 may be bathed in relatively warmer gases exiting the low pressure compartment 16. The gas flows bathing the exhaust system 46 may be selected to help maintain the exhaust system 46 within a desired temperature range. For example, in a high ambient temperature environment, it may be desirable to provide greater cooling to the exhaust system 46 by utilizing relatively cooler gases from the high pressure compartment 14. In a lower ambient temperature environment, it may be desirable to provide less cooling to the exhaust system 46 by utilizing relatively warmer gases from the low pressure compartment 16.

Various forms of aftertreatment systems for gasoline, gaseous, and diesel engine 36 exist; the selection of which depend on the engine type, application, system cost, geographical region of use, and applicable laws and regulation as would be apparent to one skilled in the art. In many cases these aftertreatment systems often have a narrow range of temperature for optimum operation depending on the underlying technology being utilized.

Embodiments of the present invention allow for regulation of the airflow across and around an optional internally mounted aftertreatment system such that they can be maintained in their optimal operating temperature ranges or prevented from going over temperature. It is noted that permanently affixed or internally mounted aftertreatment systems have an advantage in easy of system setup and shipping. This airflow regulation can be accomplished via automatic or manually adjusted flow regulators or flaps or by adjusting the pressure in the high pressure 14 or low pressure 16 compartments. It is noted that in various embodiments an alternate air flow path may be provided to route excess air flow past the aftertreatment compartment.

In one diesel embodiment of the present invention the exhaust aftertreatment system 46 utilizes a diesel particulate filter (DPF) to trap and oxidize soot and other particulate material in the exhaust stream. Such DPFs are often coated with a catalyst material to enhance their operation. DPFs can become clogged after periods of operation with soot and trapped particulate matter, requiring that they be "regenerated" to burn off the trapped material by raising their internal operating temperature by various methods, such as increasing engine load, reducing engine cooling (via less air flow), or heating the exhaust with extra fuel or by electrical heaters.

Embodiments of the present invention aid and enhance this regeneration process through the enclosed aftertreatment system 46 or by allowing the air flow past the aftertreatment system 46 to be modulated by fan control or air control flaps to foster heat elevation and retention in the DPF. In other diesel embodiments of the present invention, Diesel exhaust fluid (DEF) or other reductant (including, but not limited to, urea, aqueous ammonia, or anhydrous ammonia) can optionally be injected and mixed into the exhaust stream. The DEF is mixed with the exhaust gas stream and thermally decomposes to form ammonia ($NH_3$) which reacts with the NOx in the presence of a later catalyst, such as a selectively catalyzed reduction (SCR) catalyst, to convert the NOx and other pollutants into nitrogen, water and small amounts of carbon dioxide. It is noted that other aftertreatment systems (such as secondary air injection, and exhaust gas recirculation (EGR)) and catalysts (including but not limited to oxidizing catalysts, two way catalysts, and three way catalysts) are also known in the art.

In some embodiments, DEF is not injected before the DPF due to the DPFs catalyst coating and high operating temperature, which would degrade the DEF and reduce its effectiveness. In addition, the relatively high levels of heat in the upstream exhaust tend to increase unwanted urea crystal growth on the DEF injection system and structures. As a result of this, DEF in modern diesel exhaust aftertreatment systems is typically injected after the DPF into a long section of exhaust duct that ensures that it is well mixed with the exhaust gases and sufficiently hydrolyzed into ammonia ($NH_3$) before entry into the later coupled SCR for catalytic reduction.

The exhaust aftertreatment system 46 may include a heater, which can used to preheat the exhaust stream and may allow control of the temperature of the exhaust to within plus or minus 10° F. of the desired operation point in order to improve the performance of the aftertreatment exhaust system 46. In some instances, the heater is an electrical heater that is powered by the electrical output of the generator 30 and may also serve as a load bank for the genset 10, serving to consume at least a portion of the electrical output of the generator 30 during system testing or during periodic (e.g., weekly, monthly) exercise mode operation to verify proper operation of the genset when used as a standby system, avoiding the need for the operator to purchase a separate load bank for this purpose and possibly allowing control of the temperature of the exhaust to within plus or minus 10° F. of a desired operation point. For example, exhaust aftertreatment systems and methods that can be incorporated into the genset 10 are disclosed, for example, in co-pending U.S. patent application Ser. No. 13/706,301, filed Dec. 5, 2012 and entitled Integrated Load Bank For A Diesel Genset Exhaust Aftertreatment System, the entire disclosure of which is expressly incorporated herein by reference for all purposes.

The exhaust aftertreatment system 46 in the illustrated embodiment of the genset 10 is disposed within an engine exhaust aftertreatment compartment 60 that includes an aftertreatment inlet region 62 that is coupled to the high pressure outlet region 22 and an aftertreatment outlet region 64. In the illustrated embodiment, gas that flows out of the high pressure outlet region 22 flows through the aftertreatment compartment 60 and out of the aftertreatment outlet region 64, thereby providing a measure of cooling to the exhaust aftertreatment system 46. In other embodiments, as illustrated for example in FIGS. 7 and 8, the exhaust aftertreatment compartment 160 is instead fluidly coupled with the low pressure compartment 116. In some embodiments, the aftertreatment compartment 160 is located above one or both of the high pressure compartment 114 and the low pressure compartment 115. In some embodiments, the aftertreatment compartment 160 is substantially sealed against the high pressure compartment 114, other than the aftertreatment inlet region 162. In still other embodiments (not shown) the exhaust aftertreatment system 46 can be located within one or both of the high pressure compartment 114 and/or the low pressure compartment 116.

In some embodiments, the genset 10 provides improved acoustic performance by reducing noise that is transmitted from components within the enclosure 12 to the ambient environment outside of the enclosure 12. For example, in embodiments of the present invention utilizing a high pressure air source and fan, the high pressure inlet region 20, the high pressure outlet region 22 and the low pressure outlet region 24 may be reduced in size and/or increased in length relative to prior art gensets that have relatively larger air inlets and outlets that either directly access internal compartments or do so through short run ducts. Reducing the relative size and/or increasing the length or air flow path convolutions or non-linearity of these inlets and outlets reduces noise transmission or allows the noise to be directed in less offensive directions, such as vertically or out the side panels. In various embodiments, such as that shown in FIGS. 2-6, the air from the engine compartment 16 is discharged to the environment via a baffle or a long duct to mitigate noise transmission to the environment. It is noted that noise from the engine, for example, may travel through convolutions and be mitigated before reaching the environment.

These smaller ducts and longer/more convoluted flow paths can also reduce environmental impacts such as wind, rain, dust, cold weather, and snow on the genset 10. In some embodiments, this amounts to a reduction in the relative size of up to 86% of the air inlet region 20 and/or air outlet (such the high pressure outlet 22 or low pressure outlet 24 either alone or in combined area) without a reduction in flow rate over those of a comparable prior art genset of the same kW size. It is noted that prior art gensets and enclosures through their use of low pressure air and fans have difficulty utilizing long run ducts, multiple flow paths, or convoluted air flow/cooling paths. In addition, the increased suction and pressure of the high pressure fan can allow for filtration of the incoming air stream to reduce environmental contamination of the genset enclosure 12 internals without affecting overall airflow significantly.

In other embodiments, flaps or environmental covers can be manually or automatically placed over the inlet region 20 or air outlet regions 22, 24 to seal the genset enclosure 12 from the surrounding environment in either a shipping or long term storage mode, or to seal the enclosure from water, rain, snow, dust intrusion, or to retain heat in a "cold weather kit", such as would be generated from an internal heater placed in the engine compartment 16. Overall airflow can be additionally regulated by fan speed or inlet or outlet restriction to promote better cold weather operation and efficiency.

Figure 2:
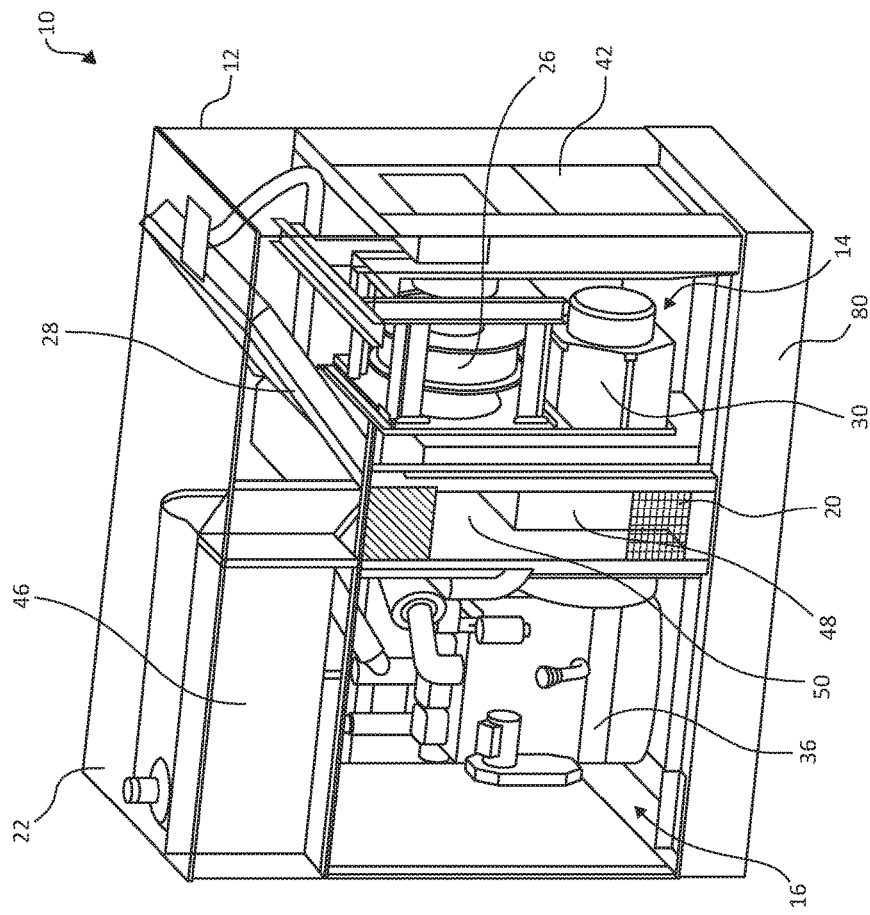
FIG. 2 is a perspective view of an electrical power generation system in accordance with embodiments of the present invention.

FIG. 2 is a detailed perspective illustration of an embodiment of the genset 10, showing how some of the internal components fit within the enclosure 12. The baffle or snorkel duct 48 can be seen as extending vertically upwardly from the high pressure inlet region 20 to a snorkel outlet 50 that is near the first fan 26. In this embodiment, the radiator 28 is located near the top of the high pressure compartment 14 and is disposed at an angle, although differing placements and orientations are contemplated in other embodiments. In some embodiments, various sizes of radiators may be employed as the radiator 28. Because the high pressure compartment 14 is pressurized, an improved uniform and laminar air flow through the radiator 28 is achieved and there does not need to be a direct correlation between fan size and shape, and radiator size and shape.

As such, for example, the "doughnut hole" effect and lack of corner air flow seen in conventional axial fan and radiator placement are not present. In other words, the "doughnut hole" effect describes the phenomenon of an axial fan blowing over a radiator, which produces relatively high airflow in the shape of a doughnut as compared to relatively less airflow through the center and corners of a radiator. In addition, other shrouding effects seen in alternative prior art fan and radiator combinations are also avoided. This has been found to increase overall radiator function and efficiency and allow for a reduction in relative size of the radiator by up to 20% over comparable sized gensets and environmental operating conditions. In addition, as will be discussed below, this also provides advantages in the modularity of the genset 10 and genset enclosure 12.

Figure 3:
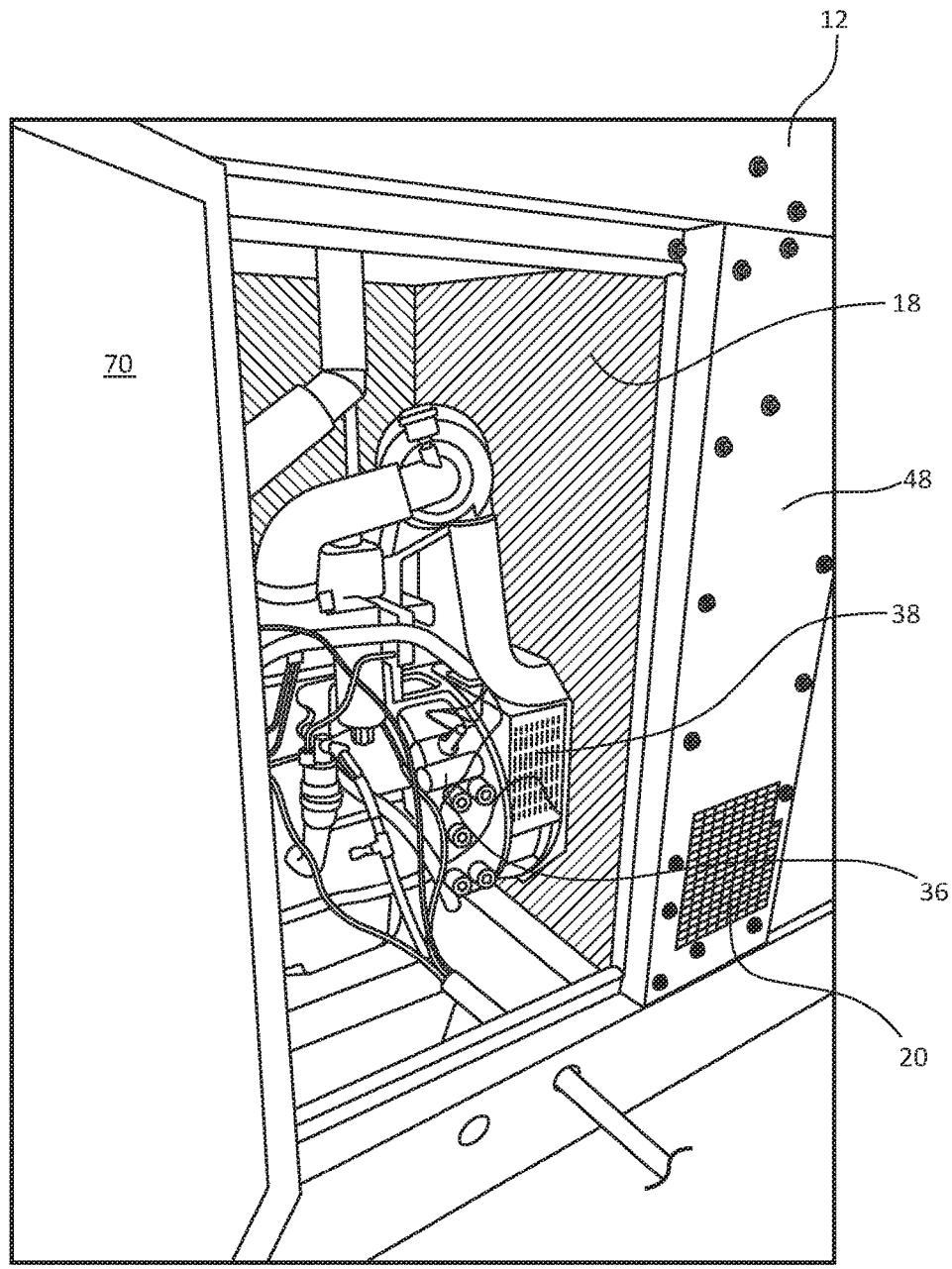
FIG. 3 is a view of an engine compartment portion of the electrical power generation system of FIG. 2.
Figure 4:
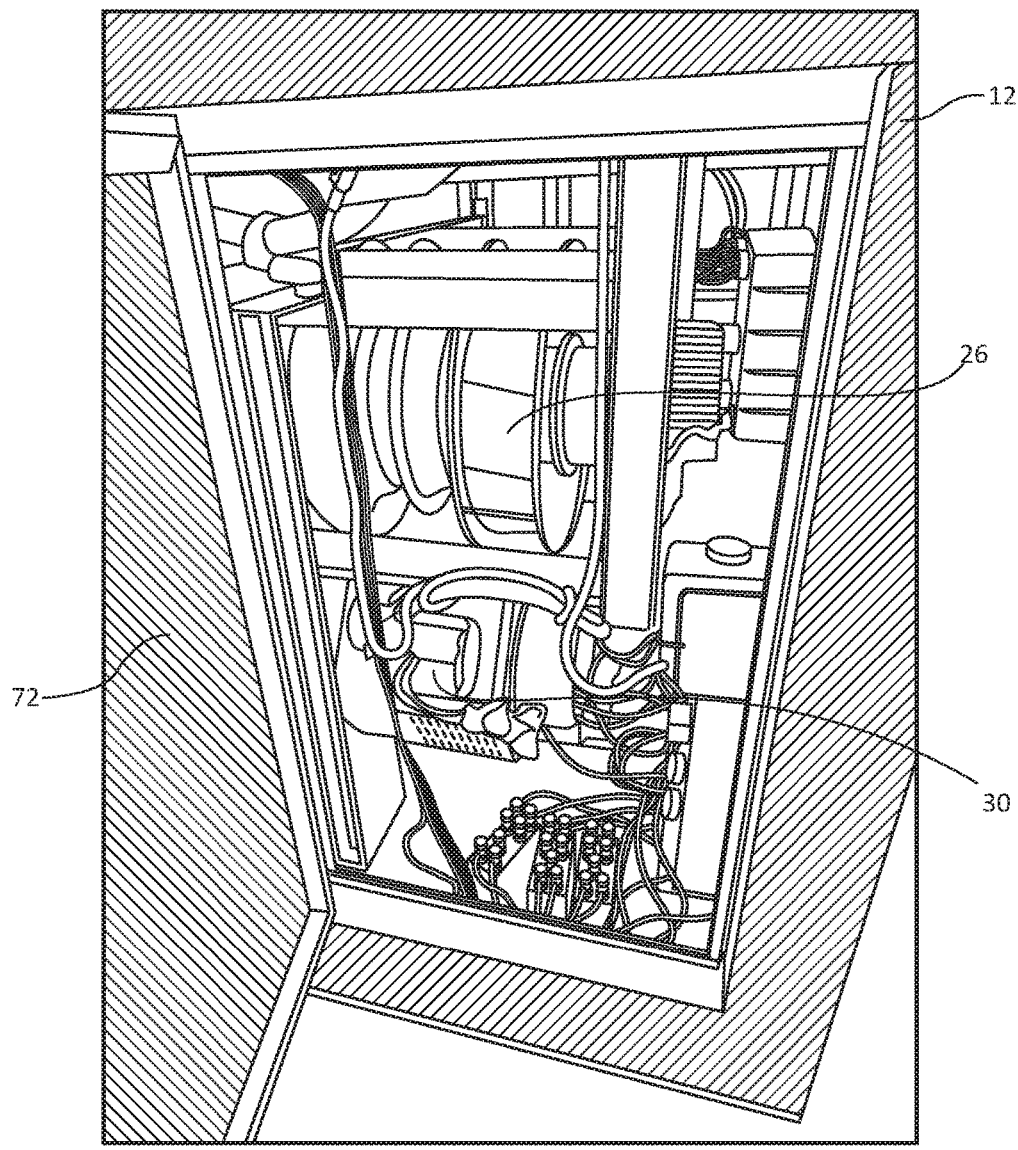
FIG. 4 is a view of an alternator compartment portion of the electrical power generation system of FIG. 2.
Figure 5:
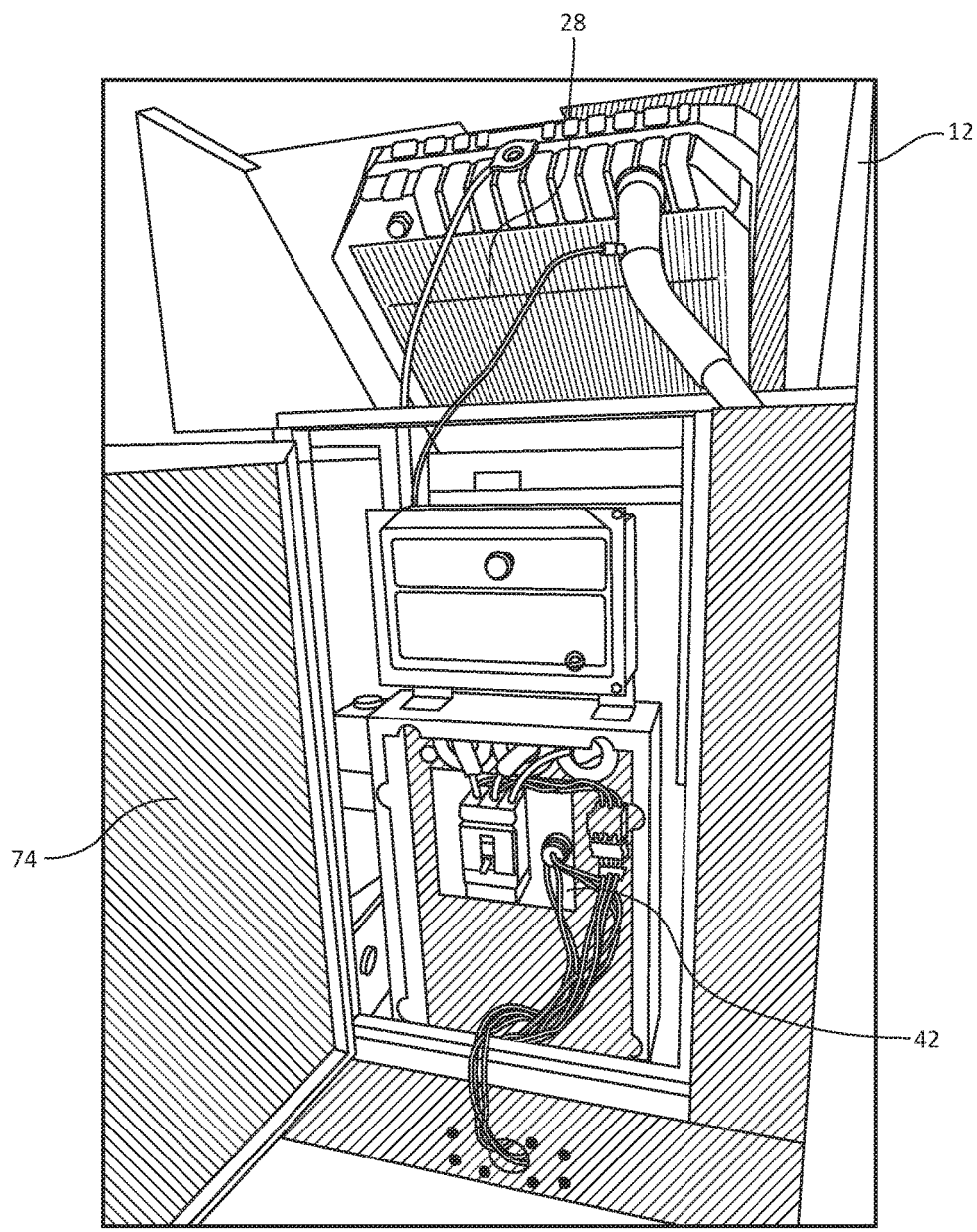
FIG. 5 is a view of a portion of the electrical power generation system of FIG. 2.
Figure 6:
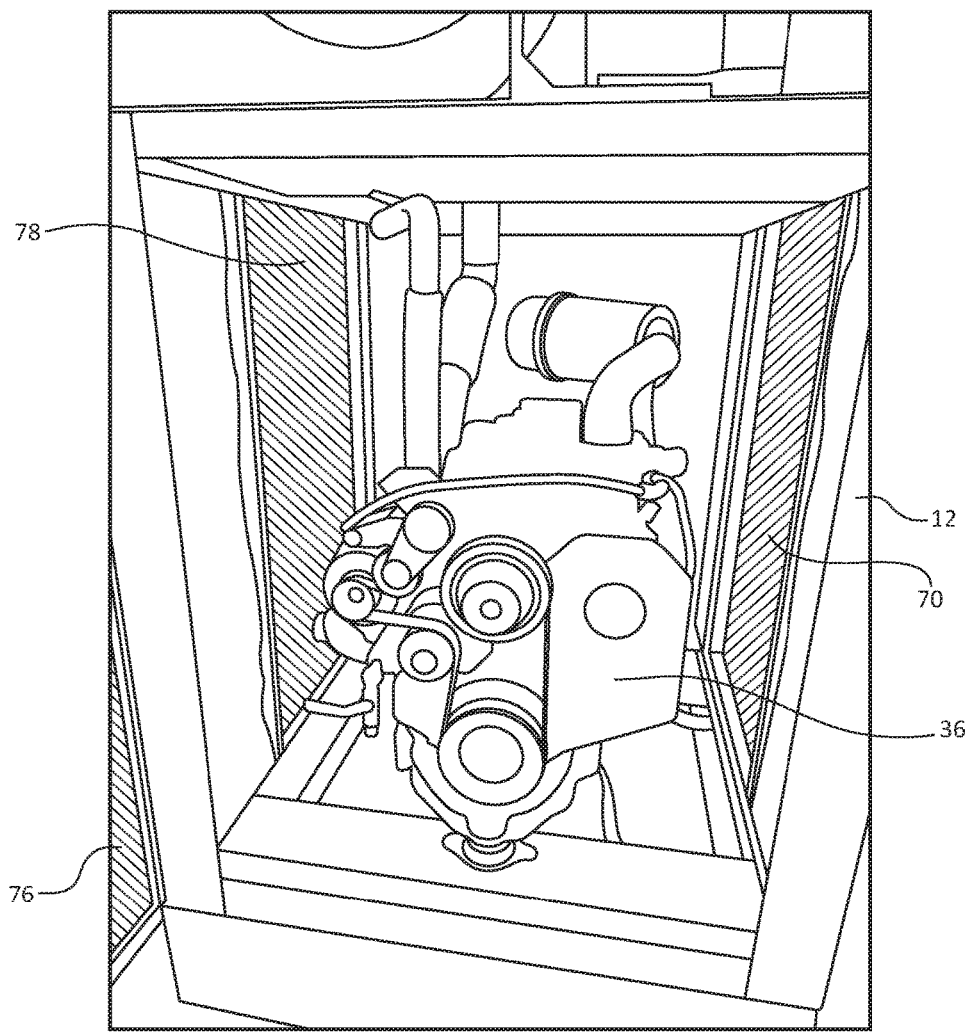
FIG. 6 is a view of a portion of the electrical power generation system of FIG. 2.

FIGS. 3 through 6 are further detailed isometric illustrations of various portions of the genset 10, illustrating how some of the internal components fit within the enclosure 12 as well as features of the enclosure 12 itself. In some embodiments, the enclosure 12 includes one or more access doors to provide access to the interior of the high pressure compartment 14 and/or the low pressure compartment 16. For example, FIG. 3 shows an access door 70 that provides access to the low pressure compartment 16, a side of the engine 36 and the second fan 38 as well as the bulkhead 18. FIG. 4 shows an access door 72 that provides access to a side of the high pressure compartment 14, including access to the generator 30 and the first fan 26. FIG. 5 shows an access door 74 that provides access to a front of the high pressure compartment 14. With door 74 open, a worker has easy access to the control box 42. FIG. 6 shows an access door 76 that provides access to the front of the low pressure compartment 16 as well as an access door 78 that provides access along a second side of the low pressure compartment 16. Because the radiator 28 is not located on the front of the engine as in many prior art gensets, access door 76 provides direct access to the front and other portions, such as the sides, of the engine 36 where there is a higher density of moving parts and therefore need for access for maintenance. Maintenance of the genset 10 is thereby facilitated and overall service time reduced. It is noted that the access doors 70, 76, and 78 provide 3-sided access to the engine. Furthermore, it is noted that the door(s) of the low pressure compartment 16 may be opened to facilitate maintenance of the engine 36 while in operation, because the radiator 28 remains functional to cool the engine as the high pressure compartment 14 may remain substantially sealed during maintenance of the engine.

It is further noted that the relative enclosed nature of the engine compartment from the ambient environment and the low flow of air aid to reduce the intrusion of dust and water and help maintain the engine in a relatively uncontaminated state. This reduces component wear and corrosion, promotes proper engine and electronics function, maintains heat rejection capability of the engine, and reduces service intervals and time.

In some embodiments, the access doors 70, 72, 74 and 76, as well as any other access doors not illustrated, may include thermal and acoustic insulation to reduce heat and noise transmission through the access doors 70, 72, 74 and 76. In some embodiments, other interior and/or exterior surfaces of the enclosure 12 may include thermal and acoustic insulation to reduce heat and noise transmission through the walls of the enclosure 12.

Figure 7:
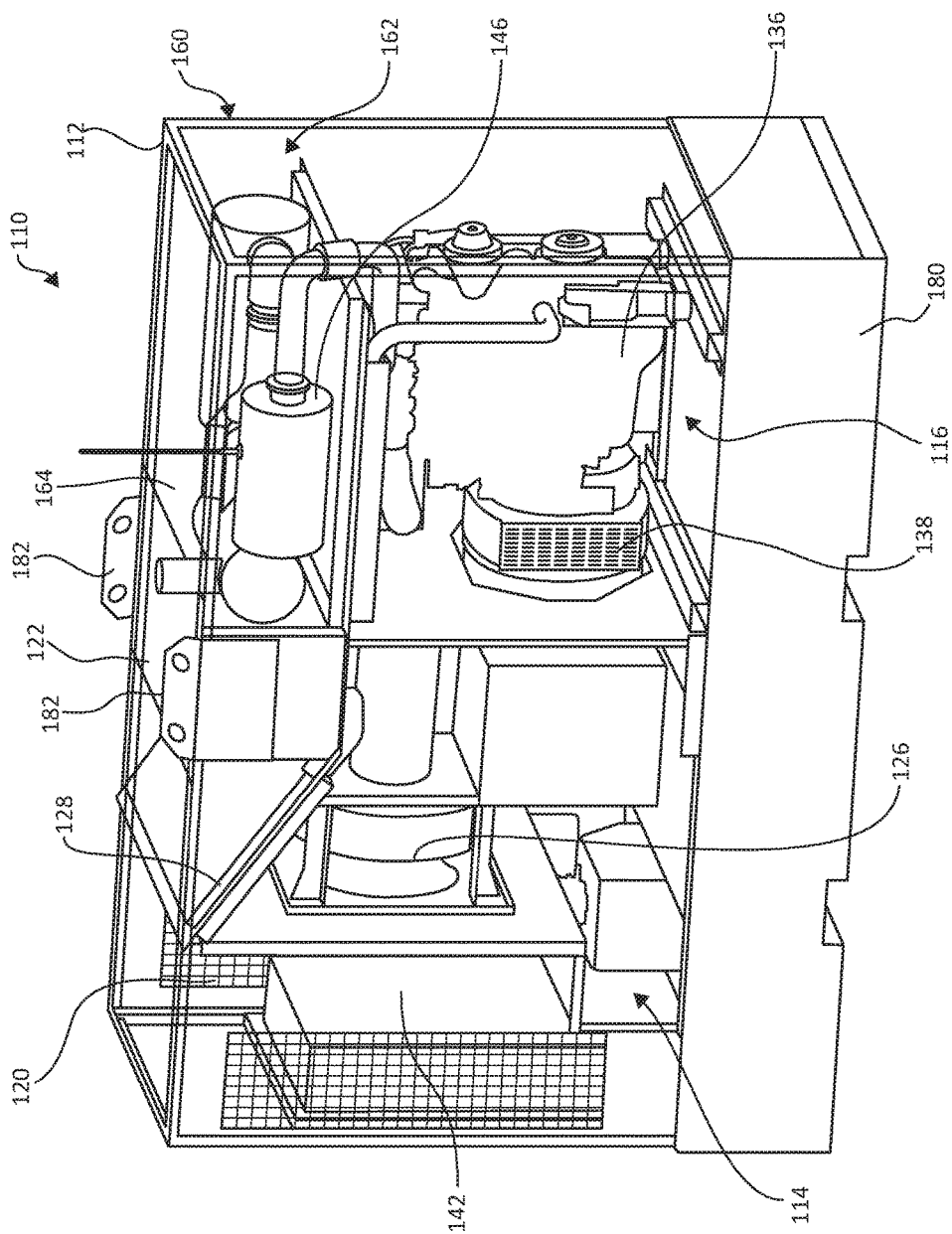
FIG. 7 is a first perspective view of an electrical power generation system in accordance with embodiments of the present invention.
Figure 8:
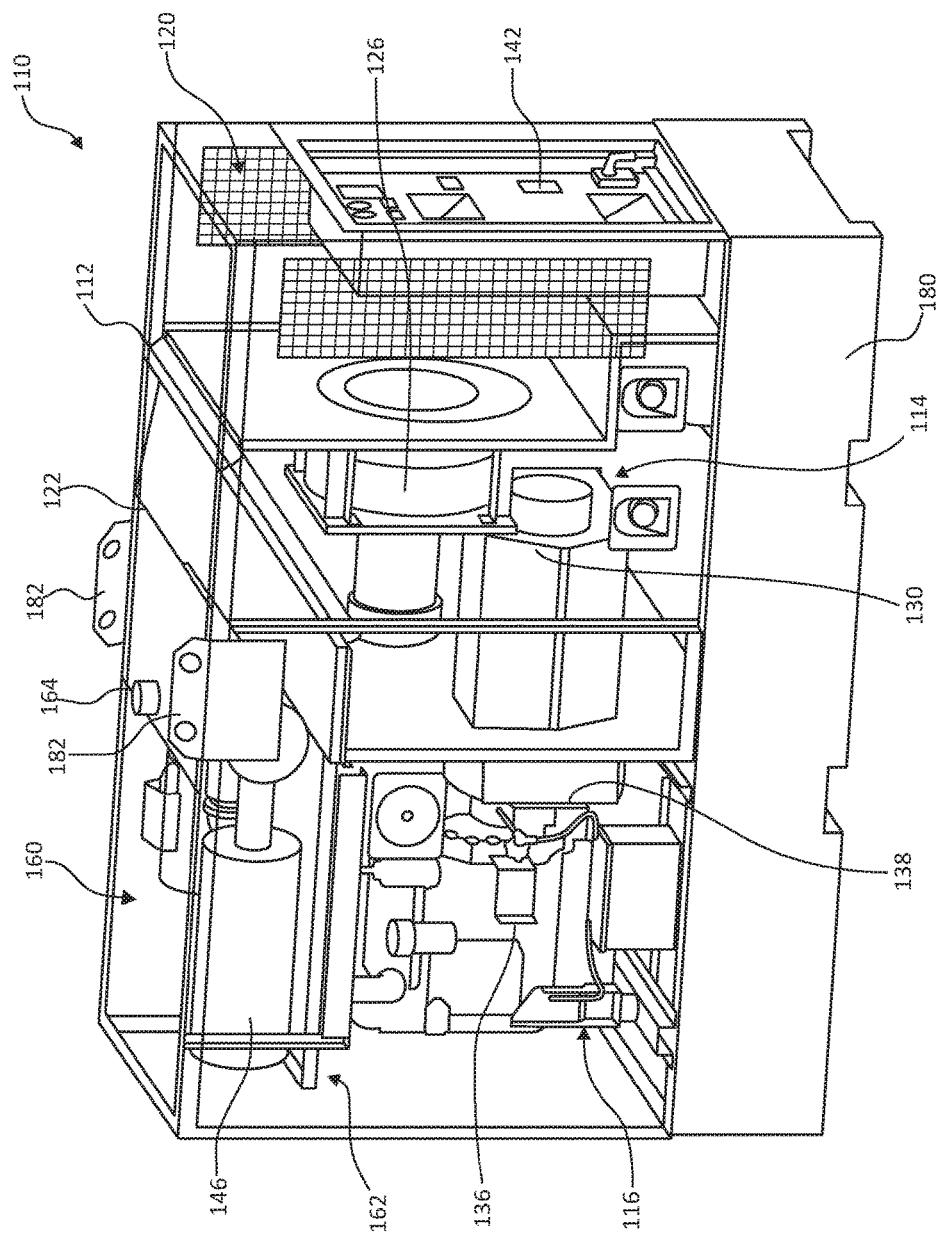
FIG. 8 is a second perspective view of the electrical power generation system of FIG. 7, showing the side opposite the side shown in FIG. 7.

FIGS. 7 and 8 provide illustrative views of opposite sides of a genset 110 in accordance with other embodiments of the invention. As shown, genset 110 includes an outlet region 122, a first fan 126, a generator 130, an engine 136, a second fan 138, and an aftertreatment system 146, which are similar to those shown in FIGS. 2-6. As shown further, an exhaust aftertreatment compartment 160 is fluidly coupled with a low pressure compartment 116, rather than a high pressure compartment 114 of the embodiment described in connection with FIGS. 2-6. The exhaust aftertreatment compartment 160 includes an aftertreatment inlet region 162 that is coupled to a low pressure outlet region 124 and an aftertreatment outlet region 164. Gas that flows out of the low pressure outlet region 124 flows through the aftertreatment compartment 160 and out the aftertreatment outlet region 164. In some embodiments, as illustrated, the aftertreatment compartment 160 is disposed above one or both of the high pressure compartment 114 and the low pressure compartment 116. In some embodiments, the aftertreatment compartment 160 is substantially sealed with respect to the low pressure compartment 116 except for the aftertreatment inlet region 162. In the embodiment detailed in FIGS. 7 and 8, there is no baffle or snorkel duct 48 fluidly coupled to the high pressure inlet region 120. Rather, the high pressure inlet region 120 is disposed proximate the control box 142. In this and other embodiments, the control box 142 is not within the high pressure chamber 114 itself, but rather is cooled by ambient air passing through the high pressure inlet region 120 and into the first fan 126. In alternative embodiments, a portion of the incoming ambient air entering the high pressure inlet region 120 is passed through the control box 142 to cool it.

The enclosure 112 and genset 110 may be built upon a base platform 180. In some embodiments the genset 110 may be built upon a trailer frame or skid frame for portability. In the illustrated embodiment the enclosure 112 includes lifting hooks 182 that may be used for transporting the genset 110.

The genset 10 (and 110) can be of a modular nature, with varying sizes of engines, generators and radiators can be placed within the enclosure 12. In prior art gensets, changing the engine size typically meant that the entire enclosure had to be redesigned and change in size because of the link between engine size and cooling fan/radiator size. A larger engine or a larger or hotter operating ambient heat range meant a larger radiator. However, in the genset 10 described herein, there does not need to be a direct correlation between fan size and shape, and radiator size and shape. Because there is a pressurized fluid coupling between the fan 26 and the radiator 28, the fan 26 is not positioned directly adjacent the radiator 28, as in many prior art gensets, and there so may not be a need to change the cooling fan size to match the radiator size or required pressure/air flow rate. As noted above, the gensets 10 and 110 provide more efficient air flow through the radiator 28 than many prior art gensets, thereby enabling more efficient engine cooling.

Figure 9:
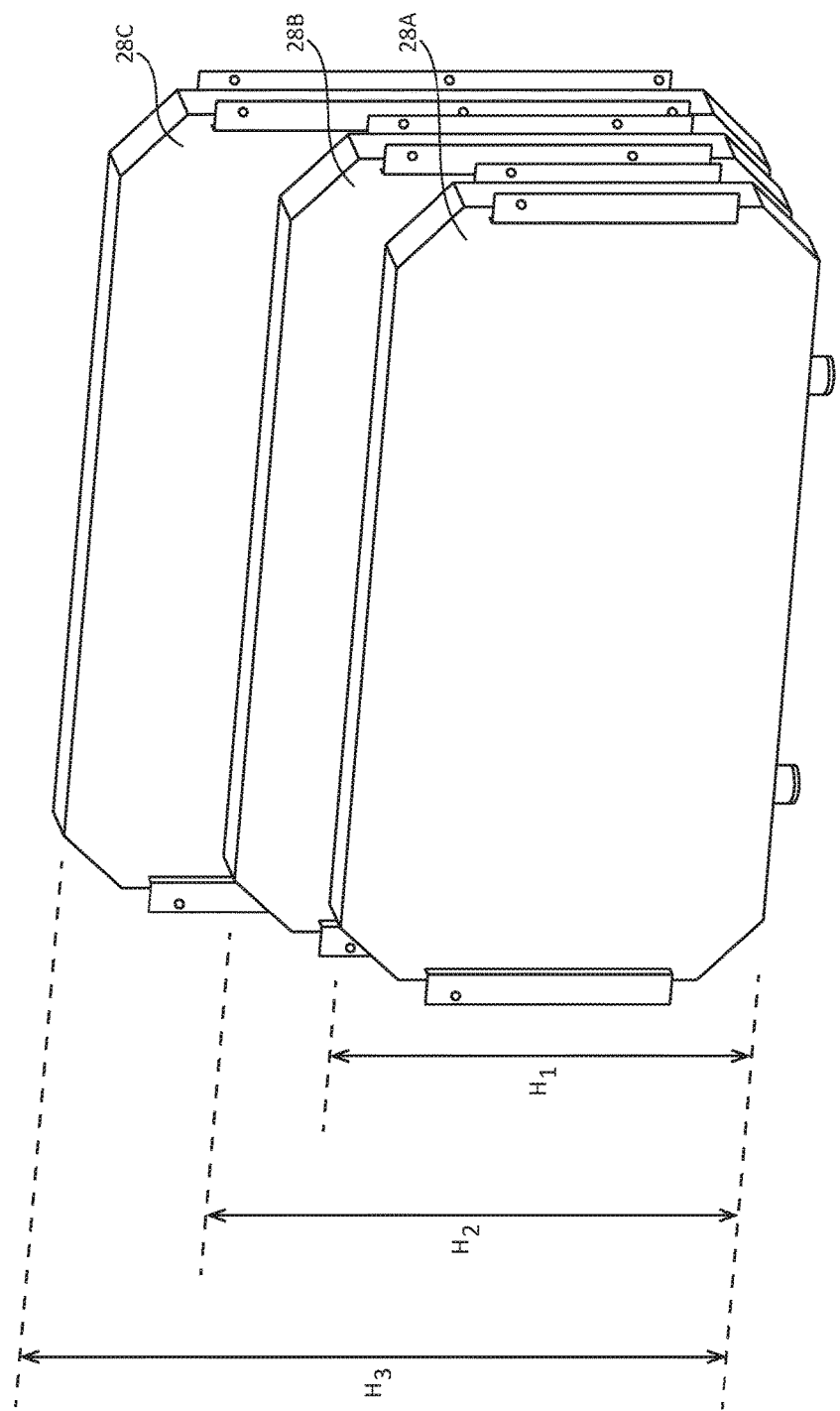
FIG. 9 is a schematic view of several different radiators useful in the electrical power generation systems of FIGS. 1-8.

FIG. 9 illustrates a modular approach that utilizes three different radiator sizes in which the radiators change only in one dimension, allowing a reduction in radiator expense and an increase in durability. In the illustrated embodiment, each of the radiators 28A, 28B and 28C have the same thickness and the same width, varying only in height. With reference back to FIGS. 2, 7 and 8, it can be seen that by virtue of the radiators 28A, 28B and 28C having the same thickness and width, they can easily be incorporated into a standard sized enclosure 12 with appropriate brackets and/or blocking plates to provide different amounts of cooling that can be tailored to other genset features such as engine size, kW output, heat rejection, and ambient operating temperatures and temperature ranges while allowing for single dimension manufacturing and/or tooling changes at the supplier. While FIGS. 2, 7 and 8 illustrate use of a single radiator, it will be appreciated that in some embodiments there may be a desire to, for example, stack two or three radiators together for enhanced cooling or to vary other dimensions or operating characteristics of a radiator family, such as thickness or width. It is noted that the uniform laminar cooling airflow produced by enclosures of embodiments of the present invention (i.e., the lack of shrouded regions or fan "doughnut hole" of prior art enclosures and fans) can reduce overall radiator area requirements by up to 20% for a selected application and ambient air operating temperature range. In alternative embodiments of the present invention, the radiator can be maintained at a comparable size to a prior art genset of the same kW size, but have the base airflow or coolant flow reduced to maintain the heat rejection required for the application.

FIGS. 10 through 13 illustrate modularity features in the enclosure 12. Differing gensets 10 or genset model families can be built for use in a particular environment, and built for a particular power generation level, and can be accommodated within a single enclosure design in which a relatively low number of enclosure parts are varied while a number of enclosure parts remain the same, regardless of environment or power generation level. For example, engine compartment side/end posts 208, 228 and roof panels 204, 224 can be lengthened to accommodate different length and kW output engines without changing the base design of the enclosure. The high pressure compartment side/end post 206 and roof panels 202, 322 can also be lengthened to accommodate differing alternators, radiators, control boxes 42, and fans. The end posts 206, 208, 228 and the center column can also be increased in height to accommodate taller engines, radiators, or aftertreatment systems. Wider systems can also be accommodated through the use of a wider roof 202, 204, 224, 322 and bases/base members/floor panels, end panels (or end posts 206, 208, 228) and center section.

Figure 10:
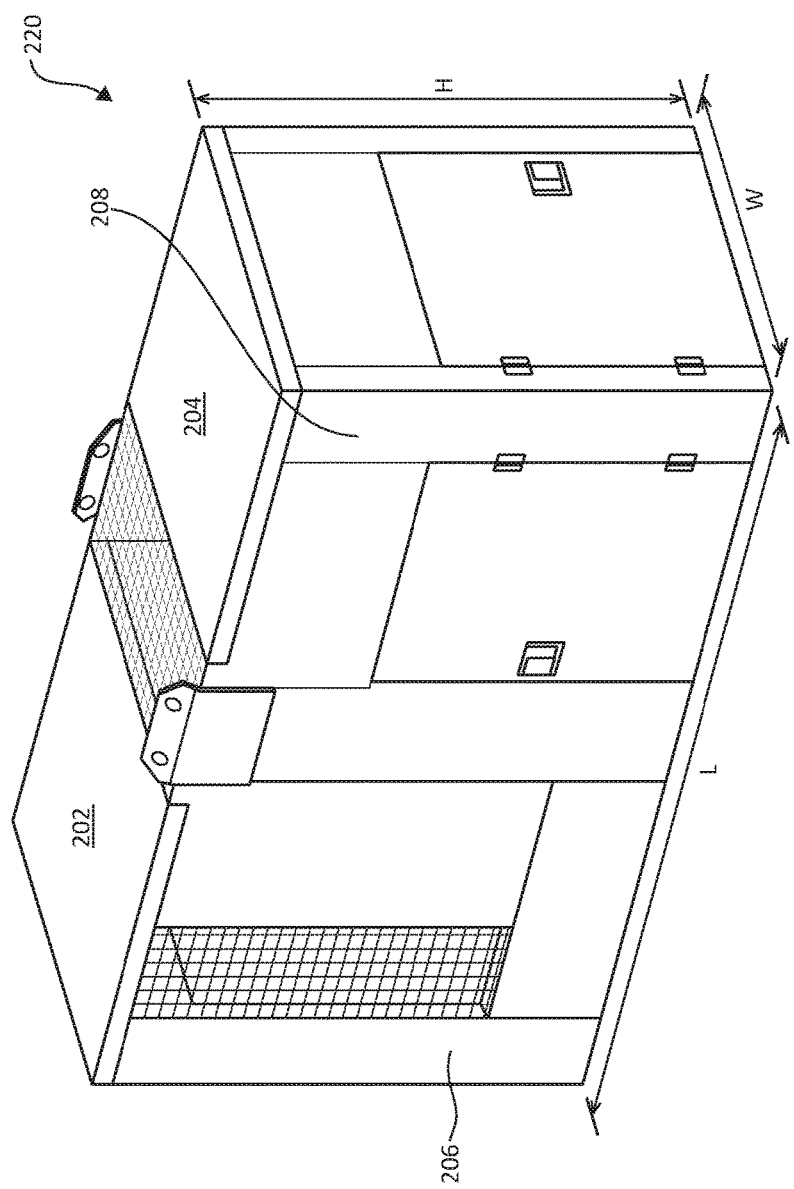
FIG. 10 is a perspective view of an electrical power generation system, illustrating its modular nature, in accordance with embodiments of the present invention.

FIG. 10 illustrates an enclosure 220 that can be used for a genset expected to output 60 to 125 kW of power (still other embodiments contemplate a range of 20 to 300 kW of power), meeting Tier4F emissions requirements at an ambient temperature of 40° C. or meeting Tier3 emissions requirements at an ambient temperature of 50° C. The enclosure 220 has a length L of about 2.8 meters, a width W of 1.1 meters and a height of about 1.5 meters. The enclosure 220 includes end posts 206 and end posts 208 and includes roof panels 202 and 204. The roof panels 202 and 204 each have a width of 1.1 meters and a length of 1.3 meters.

Figure 11:
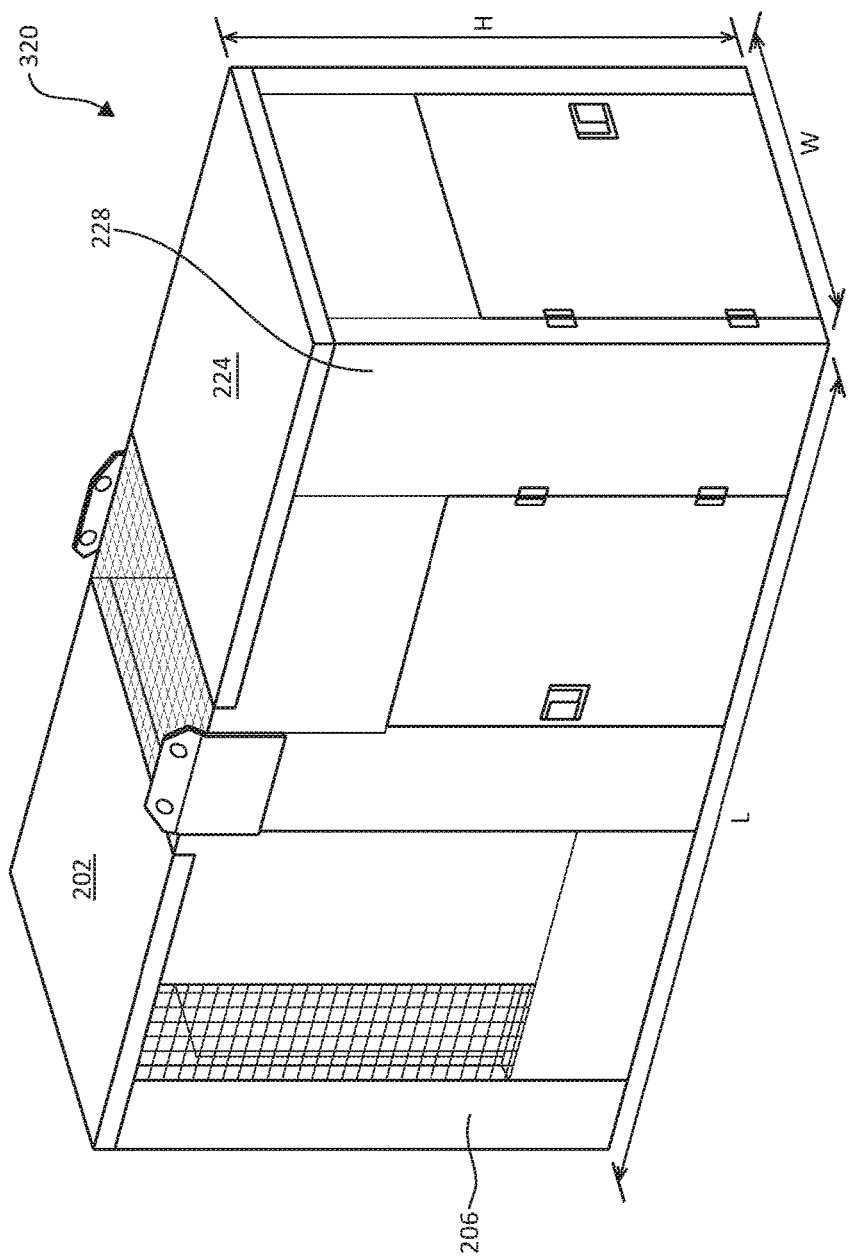
FIG. 11 is a perspective view of an electrical power generation system, illustrating its modular nature, in accordance with embodiments of the present invention.

FIG. 11 illustrates an enclosure 320 that can be used for a genset expected to output 100 to 200 kW of power, meeting Tier3 emissions requirements at an ambient temperature of 40° C. The enclosure 320 has a length L of about 3.1 meters, a width W of 1.1 meters and a height of about 1.5 meters. The enclosure 320 includes end posts 206 and end posts 228 and includes roof panels 202 and 224. The roof panel 202 has a width of 1.1 meters and a length of 1.3 meters and the roof panel 224 has a width of 1.1 meters and a length of 1.6 meters.

Figure 12:
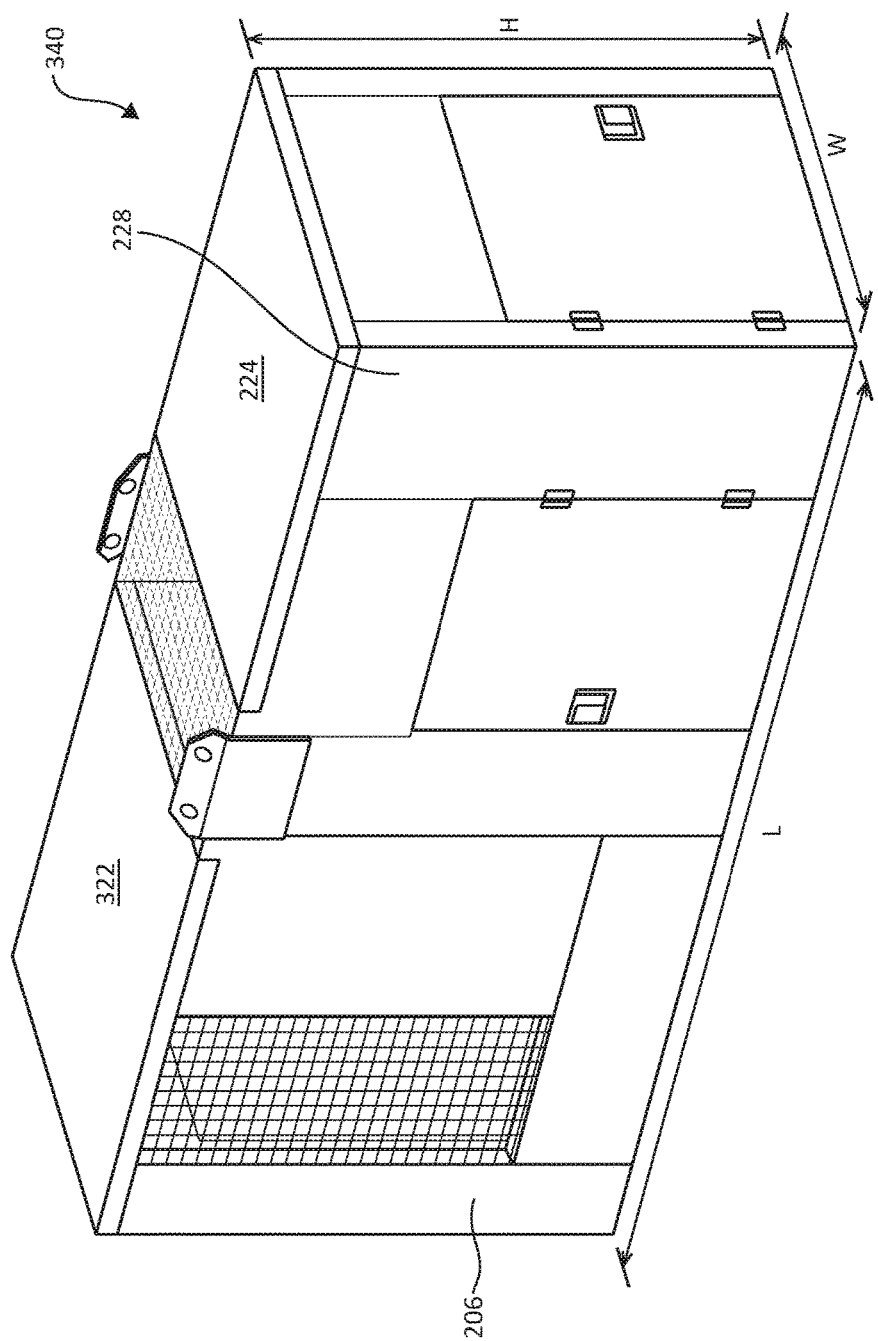
FIG. 12 is a perspective view of an electrical power generation system, illustrating its modular nature, in accordance with embodiments of the present invention.

FIG. 12 illustrates an enclosure 340 that can be used for a genset expected to output 100 to 200 kW of power, meeting Tier4F emissions requirements at an ambient temperature of 40° C. or meeting Tier3 emissions requirements at an ambient temperature of 50° C. The enclosure 340 has a length L of about 3.4 meters, a width W of 1.1 meters and a height of about 1.5 meters. The enclosure 340 includes end posts 206 and end posts 228 and includes roof panels 322 and 224. The roof panel 322 has a width of 1.1 meters and a length of 1.6 meters and the roof panel 224 has a width of 1.1 meters and a length of 1.6 meters.

Figure 13:
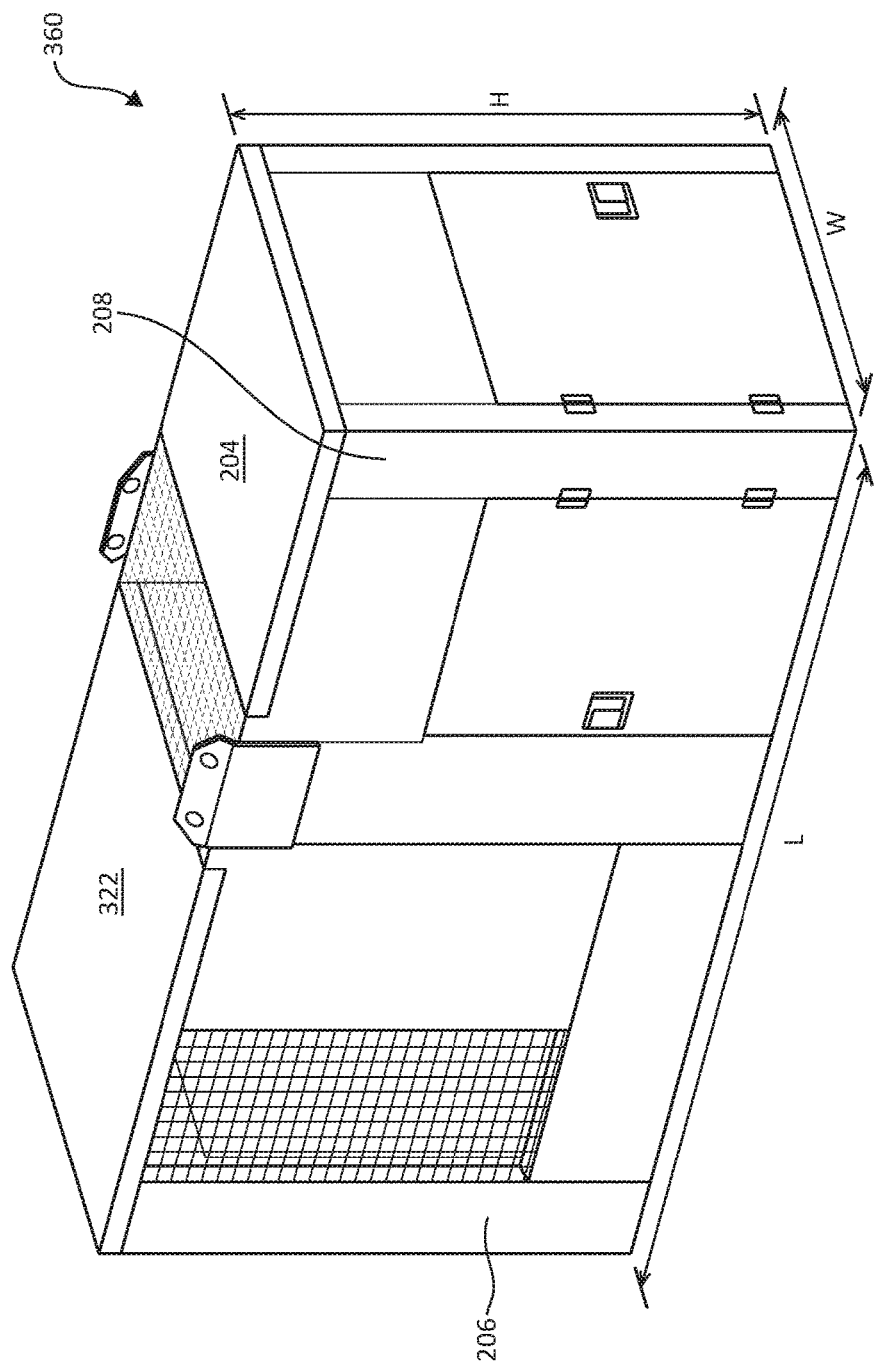
FIG. 13 is a perspective view of an electrical power generation system, illustrating its modular nature, in accordance with embodiments of the present invention.

FIG. 13 illustrates an enclosure 360 that can be used for a genset expected to output 50 to 100 kW of power, meeting Tier4F emissions requirements at an ambient temperature of 50° C. or meeting Tier3 emissions requirements at an ambient temperature of greater than 50° C. The enclosure 360 has a length L of about 3.1 meters, a width W of 1.1 meters and a height of about 1.5 meters. The enclosure 360 includes end posts 206 and end posts 208 and includes roof panels 322 and 204. The roof panel 322 has a width of 1.1 meters and a length of 1.6 meters and the roof panel 204 has a width of 1.1 meters and a length of 1.3 meters.

The enclosures 220, 320, 340, and 360 are illustrative only, as any size enclosure can be constructed to accommodate any desired genset size. Each of the enclosures 220, 320, 340 and 360 can be constructed using several different posts and several different roof panels. Other components, such as access doors, can be commonly used in building any size enclosure.

Figure 14:
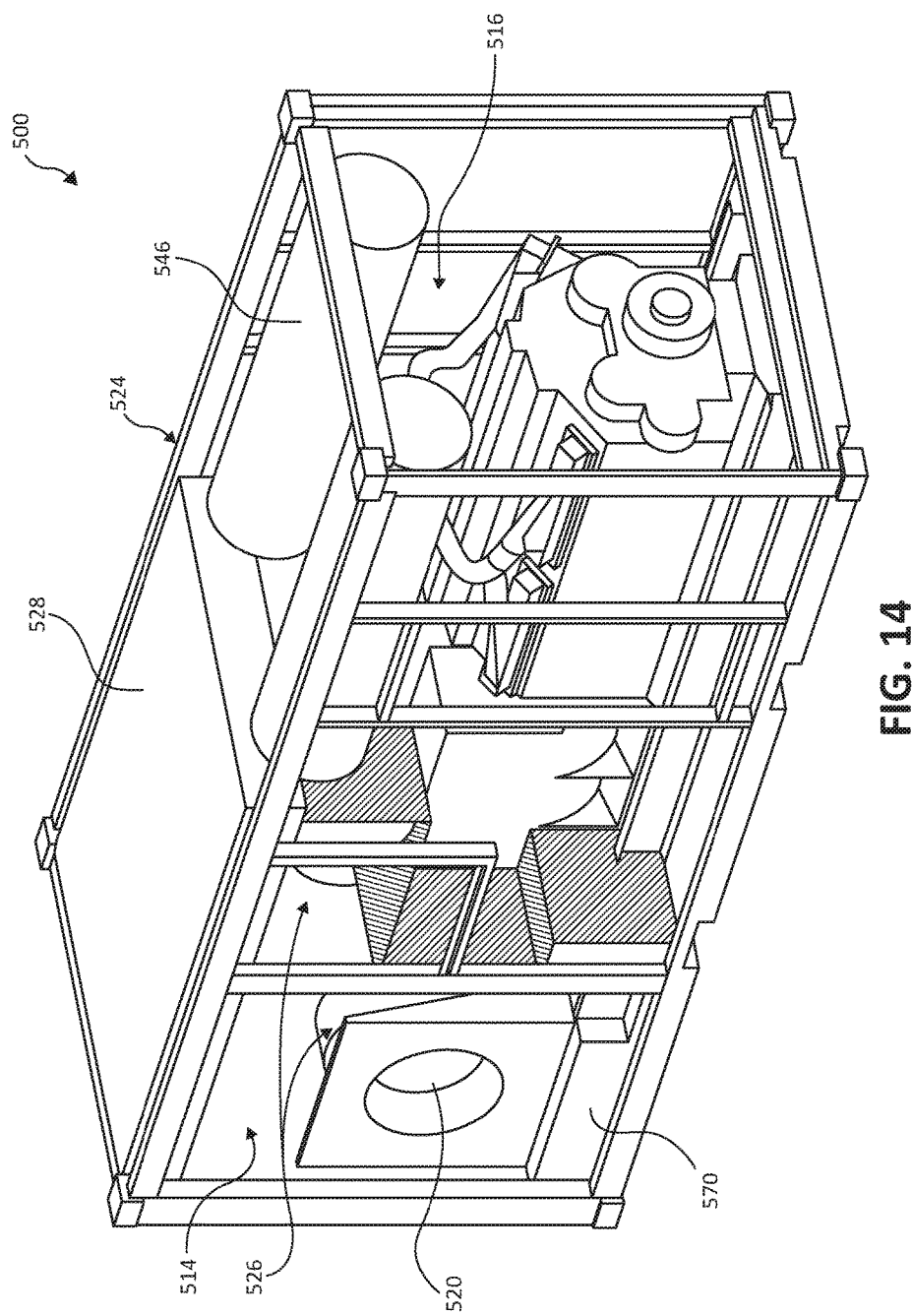
FIG. 14 is a first perspective view of an electrical power generation system in accordance with embodiments of the present invention.
Figure 15:
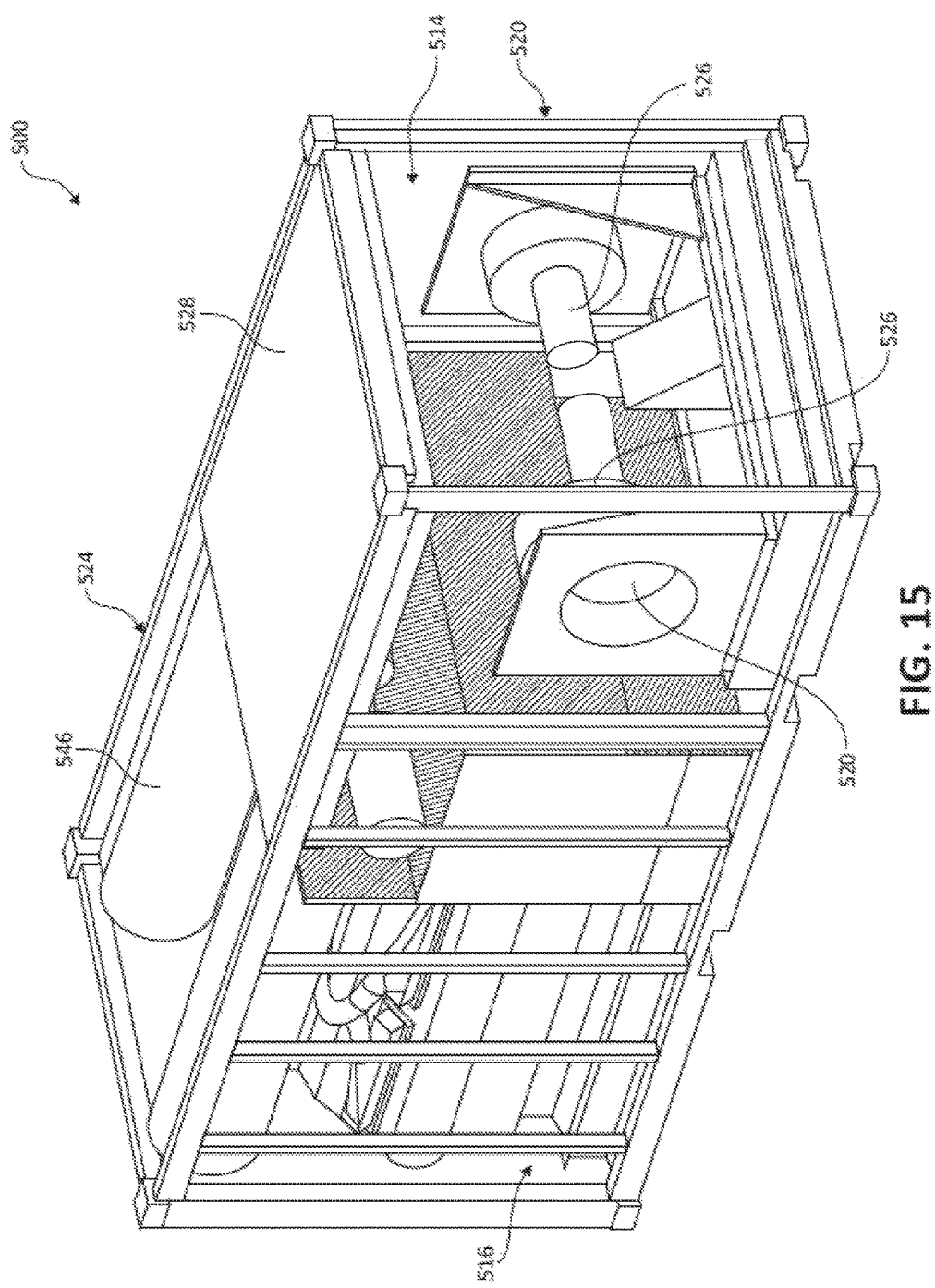
FIG. 15 is a second perspective view of the electrical power generation system of FIG. 14, showing the side opposite that shown in FIG. 14.

FIGS. 14 and 15 illustrate an alternative embodiment of the present invention for high horsepower applications, where an enclosure 500 is shown having two high pressure fans 526 mounted on opposite sides of the high pressure compartment 514, each having its own a high pressure inlet 520 through its respective side wall. Radiator 528 is mounted in the roof of the high pressure compartment 514 allowing heated air and noise to be directed and exit vertically. Aftertreatment system and/or mufflers 546 are isolated from the engine compartment 16 by a horizontal bulkhead (not shown). Air exits the engine compartment 516 at or near the distal end of the enclosure and flows back along the aftertreatment system and/or mufflers 546 to cool them and exit adjacent to the mid-point of the compartment at the low pressure outlet 524, near the radiator 528. It is noted that this arrangement directs heated air and exhaust vertically out of the enclosure 500, along with a large portion of the entrained noise of the exhaust and heated airflows; the only horizontal openings and noise sources are the side mounted high pressure fan inlets 520. It is further noted that in the embodiment of FIGS. 14 and 15, an optional fuel tank 570 is mounted beneath the high pressure fans 526 in the high pressure compartment 514.

Figure 16:
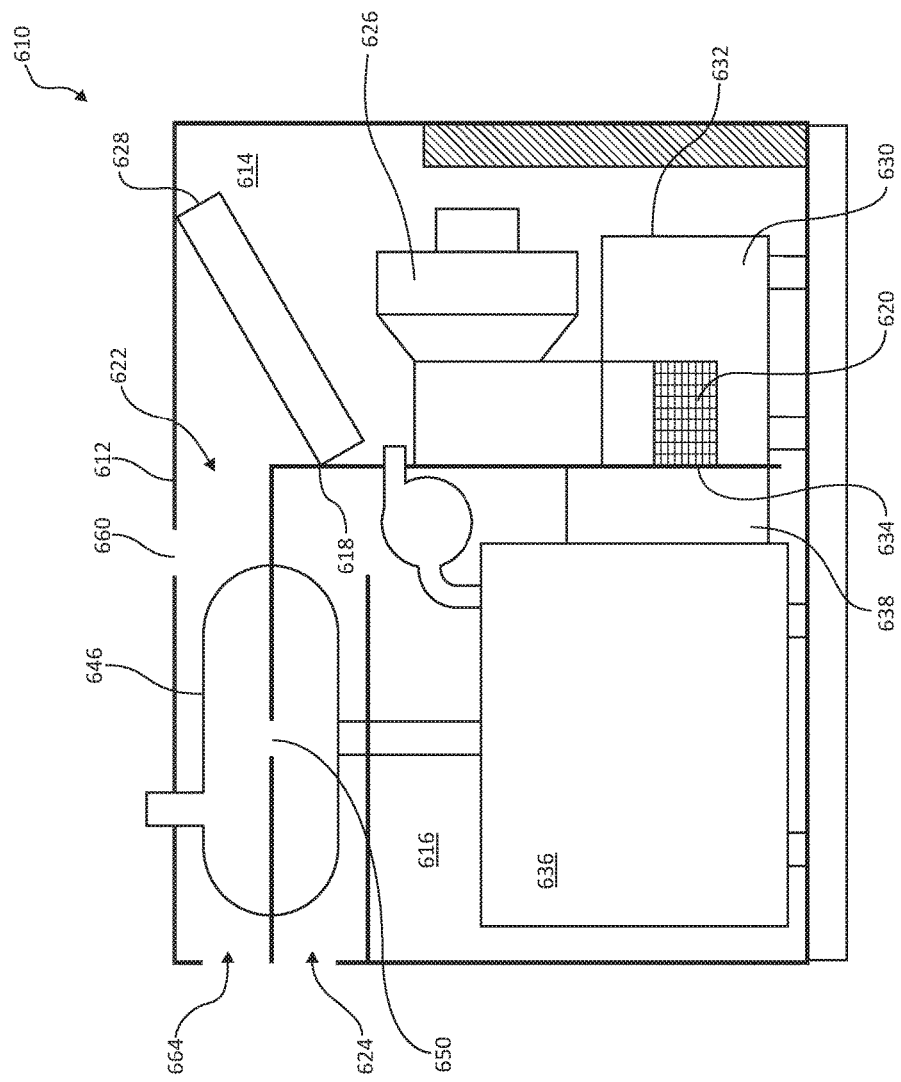
FIG. 16 is a schematic illustration of an electrical power generation system having a cold-air recirculation warm-up mode in accordance with embodiments of the present invention.
Figure 17:
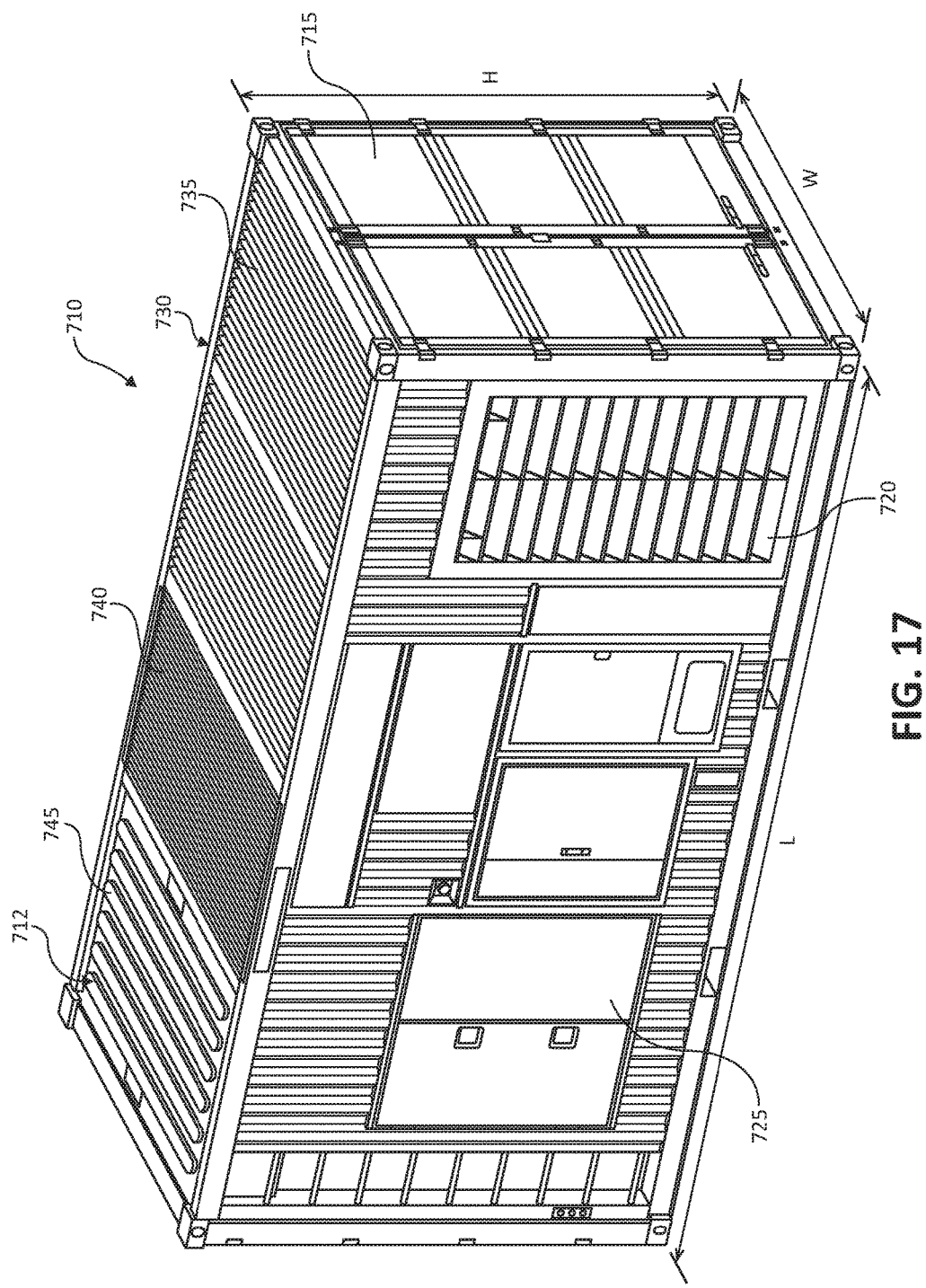
FIGS. 17-18 are perspective views of an electrical power generation system in the size of a standard ISO container in accordance with embodiments of the present invention.

FIG. 16 shows a schematic illustration of an electrical power generation system or genset 610 configured for a cold-air recirculation warm-up mode in accordance with further embodiments. Except where noted, the electrical power generation system 610 is similar to genset 10 and similarly numbered. System 610 includes an enclosure 612, a generator compartment 614, an engine compartment 616, and a bulkhead 618. An engine 636 in the engine compartment 616 is coupled to a radiator 628 for cooling. A generator compartment inlet 620 provides a path for ambient air to flow into the generator compartment 614. A high pressure or first fan 626 is configured to draw air into the generator compartment 614 to create a high pressure in the generator compartment 614. A generator compartment outlet 622 provides a path for air to leave the generator compartment 614 through a radiator 628. The air may further escape to the ambient environment through optional roof opening 660 and through the enclosure opening 664. Genset 610 may include optional opening 650. However, when the genset 610 is running normally, the pressure from the engine compartment 616 being higher than ambient creates a path of least resistance for air from the generator compartment 614 to escape through the other openings 660, 664.

The generator 630 has a generator inlet 632 and a generator outlet 634 provide another path for air to leave generator compartment 614 to engine compartment 616. A generator fan 638 is coupled to the generator outlet 634 and is configured to create a draw air from the generator compartment 614 to the engine compartment 616. The engine compartment outlet 624 is coupled to the engine compartment 616 and allows air to leave into the ambient environment. As explained above, the engine compartment outlet 624 is the path of least resistance for the pressurized air in the engine compartment 616 to escape to the ambient environment, rather than through opening 650.

The genset 610 may be further configured in various embodiments to detect the temperature of the ambient air and determine that the ambient air is sufficiently cold, for example, when it exceeds a lower threshold that would cause engine 636 to run inefficiently. As another example, the aftertreatment system 646 may require a regeneration cycle, when a higher temperature within the enclosure 612 would be advantageous. In response to at least one such condition, the genset 610 is configured to begin a cold-air recirculation warm-up mode. In this mode, the first fan 626 is turned off or substantially reduced from its maximum output, and the second fan 638 is turned on or remains running. Because the first fan 626 is disabled, the pressure in the generator compartment 614 is closer to ambient pressure or much less than the high pressure created with the first fan enabled. With the second fan 638 operational, air is still drawn from the generator compartment 614 to the engine compartment 616 through the generator 630, specifically through the generator inlet 632 and the generator outlet 634.

As air is drawn through, the second fan 638 operates to create a pressure differential between the engine compartment 616 and the generator compartment 614, so the engine compartment 616 has a first pressure higher than a second pressure in the generator compartment 614. As a result, a substantial portion of the pressurized air in the engine compartment 616 flows through opening 650 instead of engine compartment outlet 624. Then, a substantial portion of the pressurized air flows through the generator compartment outlet 622, past radiator 628, and into generator compartment 614 instead of the enclosure opening 664 and the roof opening 660. This recirculation path allows air in the enclosure 612 to be recirculated so that the temperature of the components in the enclosure 612 can be maintained at a temperature above ambient temperature when desired. Advantageously, the cold-air recirculation warm-up mode may be enabled and disabled while the genset 610 is operating. In addition, first fan 626 can be turned on or operated at a higher level as the genset 610 warms up or as heat rejection needs increase to bring increasing amounts of cold outside air into the recirculating air mass in the genset enclosure 610 as required.

FIGS. 17-21 are views of a modular electrical power generation system or genset 710 in the size of a standard-size ISO container in accordance with embodiments of the present invention. The modular genset 710 incorporates substantially similar features described herein elsewhere, but the enclosure 712 of the modular genset 710 is sized and structured to the shape of a standard ISO container while the interior components, interior panels, and exterior panels may vary based on a selected configuration. In some embodiments, the enclosure 712 is a modified standard-size ISO container that has standard-size openings cut into the standard enclosure, in the roof and side(s), that may then be occupied by panels sized and shaped to particular applications. The enclosure 712 has a length L, a width W, and a height H that are selected to match standard ISO container sizing standards as well as the application for which the genset 710 is being used. For example, L×W×H may be selected based on the size of the engine, the size of the generator, the fuel storage requirements, and transportation parameters, among other considerations. In some embodiments, the length L that is selected from 20 feet, 30 feet, 40 feet, and 48 feet. In various embodiments, the height H is selected from a standard height of 8.5 feet or a high-cube height of 9.5 feet. The width W is typically 8 feet. These sizes enable the enclosure 712 to be compatible for stacking and transporting along with other standard-size ISO shipping containers. Also, these sizes enable power generation in an exemplary range of 500 kW to 1500 kW. For example, a standard ISO container 20 feet in length may be cut with standard-size openings and then provided with panels sized to a power output in the range of 500-1500 kW. As another example, a standard ISO container 40 feet in length may be cut with standard-size openings and then provided with panels sized to a power output in the range of 1500-2500 kW.

The genset 710 is similar to other gensets described herein elsewhere in that it includes a generator compartment 714 (i.e. high pressure) and an engine compartment 716 (i.e. low pressure). The doors 715 open into the generator compartment 714. As shown, louvers 720 provide an inlet into the generator compartment 714 when the generator compartment doors 715 are closed. In some embodiments, the louvers are Z-shaped louvers structured to require intake air to rise while passing through the louver, which filters some debris and dust particles upon intake. In further embodiments, the louvers may be gravity louvers and/or be associated with one or more high pressure fans 760. The gravity louvers close by the force of gravity or air pressure of the generator compartment 714, for example, when the genset 710 is not operating or when the associated high pressure fan 760 is disabled. Association of gravity louvers with one or more high pressure fans 760 allows for a fan failsafe to maintain pressure when a fan fails or allows for energy savings by shutting down unneeded fans when cooling demand is low. The louvers 720 may be backed by air filters 765 to further filter debris and dust particles. In some embodiments, gravity louvers and Z-shaped louvers are both used to provide further enhanced filtering.

Figure 18:
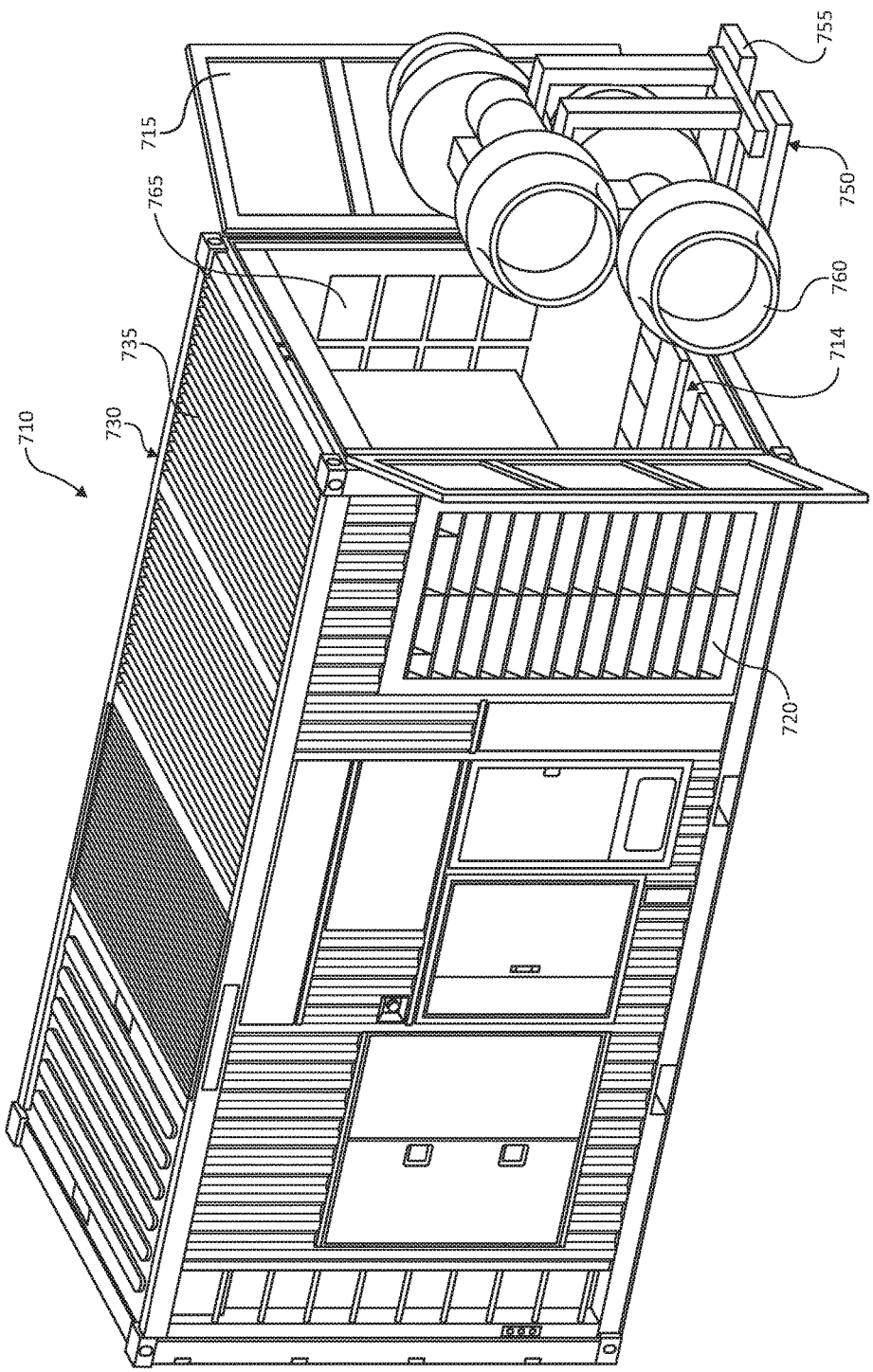

In various embodiments, the genset 710 includes a removable fan rack 750. The fan rack 750 may include fans 760 on a sliding mount 755. The sliding mount 755 is configured to slide into the generator compartment, which may include rails, for example. The fans 760 may be similar to those described herein elsewhere. As shown in FIG. 18, the removable fan rack 750 is slidably removed into the generator compartment 714. Also, as shown, the fans 760 may be mounted in pairs. Those pairs may be off-center from each other to accommodate for the presence of a motor, which may be an electric motor. In some embodiments, the high pressure fans 760 may comprise 1 fan, 2 fans, 4 fans, or any other number based on the cooling requirements of the genset 710 and the space available in the modular genset 710.

The doors 725 open into the engine compartment. Similar to other genset embodiments, additional doors may be included on the end of the engine compartment and on the other side of the engine compartment to provide 3-sided access to the engine for ease of maintenance.

The enclosure 712 also includes a roof 730. As shown, the roof 730 comprises a generator compartment panel 735 disposed at least partially above the generator compartment 714, an exhaust panel 740 disposed at least partially above the exhaust system, and an engine compartment panel 745 disposed at least partially above the engine compartment. The generator compartment panel 735 may be sized to match the size of a radiator disposed within the generator compartment 714. For example, the generator compartment panel 735 may substantially allow air to flow through a radiator to flow into the ambient environment. The exhaust panel 740 may be sized to allow exhaust gases and pressurized air to escape into the ambient environment. The engine compartment panel 745 is generally sealed to protect the engine compartment from the environment. In various embodiments, the generator compartment panel 735 and the exhaust panel 740 occupy areas of an ISO container that have been cut out, and engine compartment panel 735 is a portion of the standard ISO container roof that has not been cut out. The roof panels may be further sized to the application as shown in further detail in FIGS. 19-21.

Figure 19:
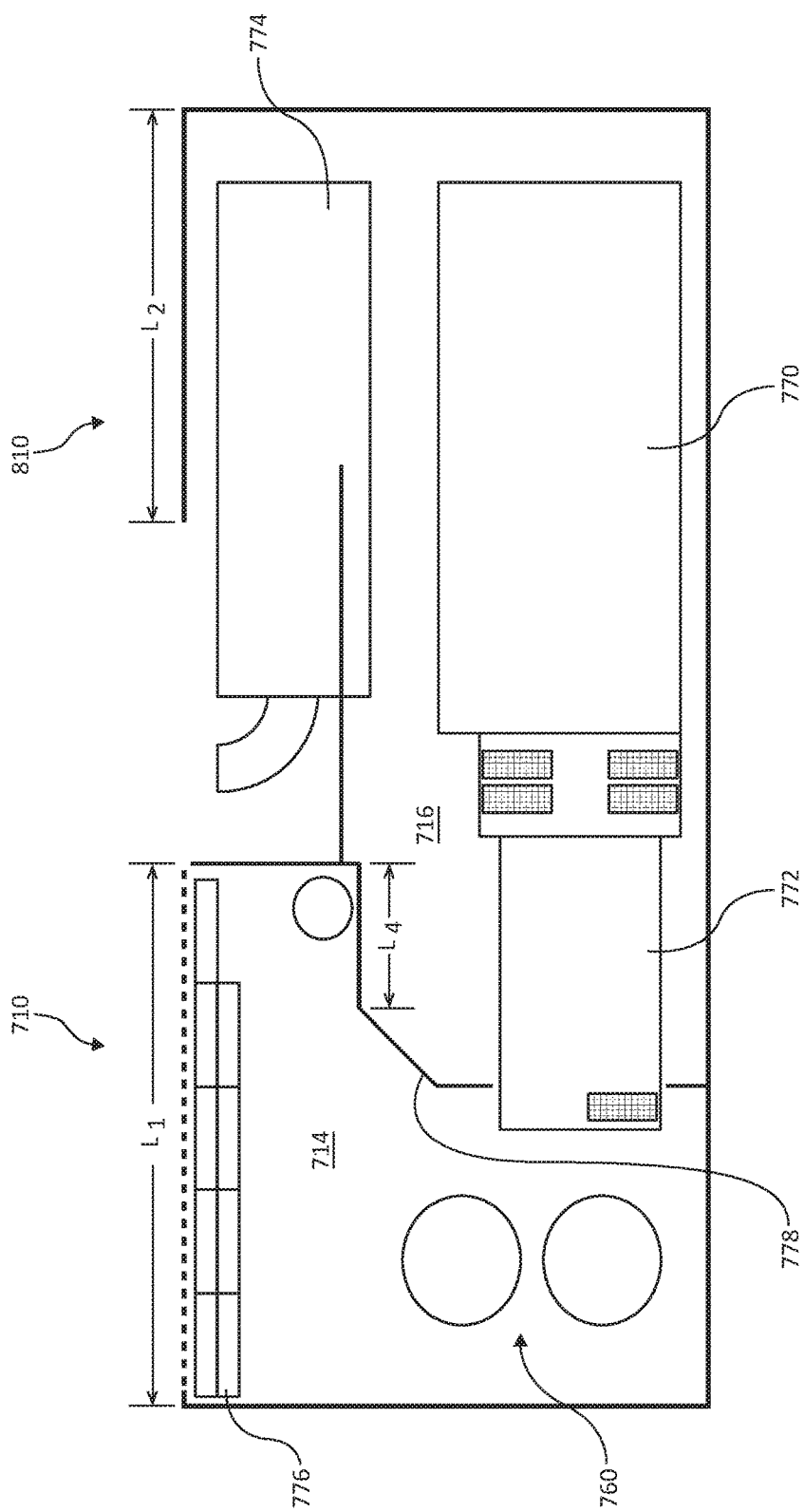
Figure 20:
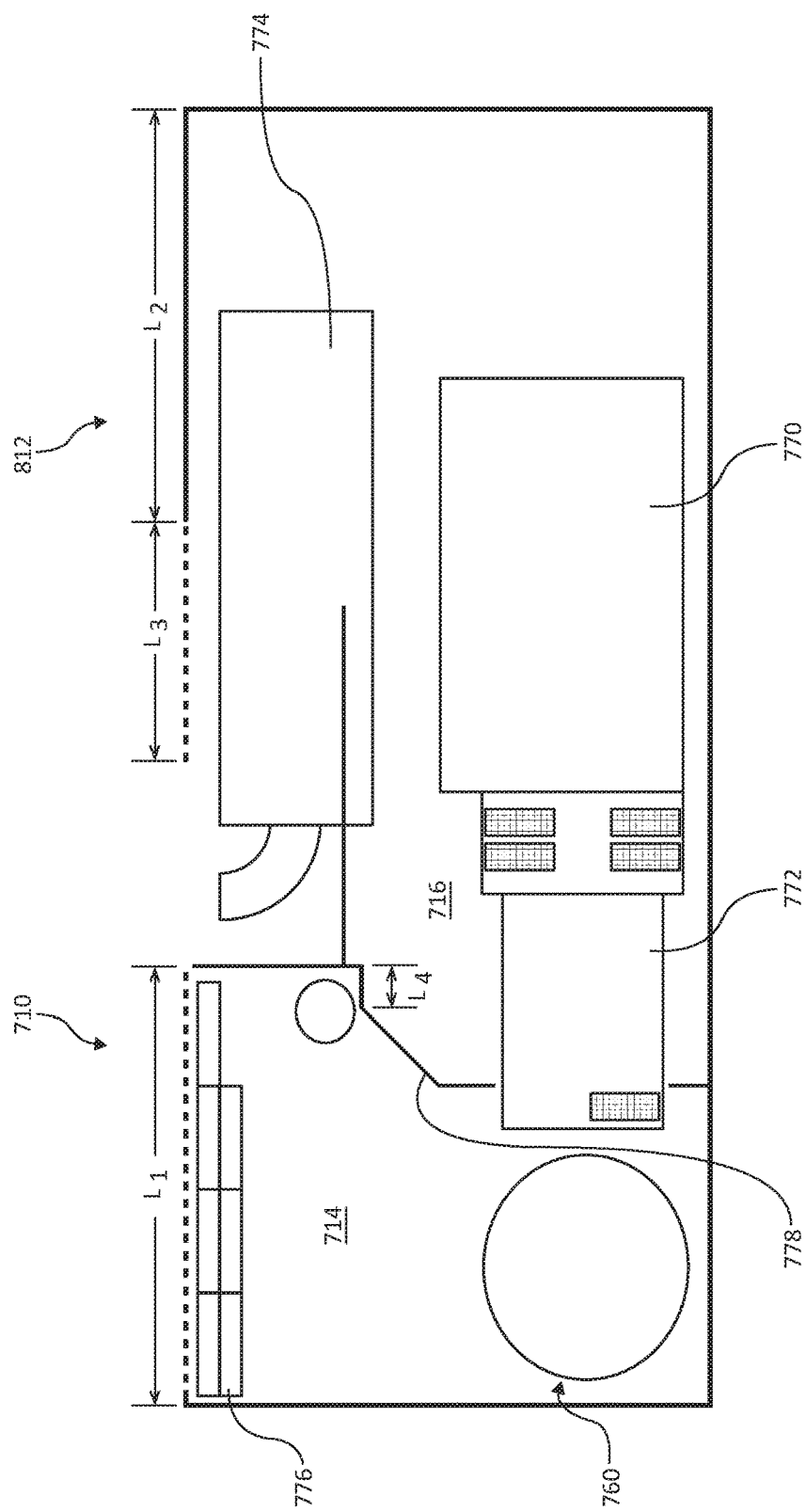

FIGS. 19-21 are schematic illustrations of the modular genset 710 in various configurations 810, 812, and 814. The modular genset 710 has panels or portions that change based on the size of the required genset components, such as the size of the fans 760, engine 770, generator 772, the exhaust system 774 (including possible exhaust aftertreatment), and the radiator 776 coupled to the engine. In general, the required components are typically selected based on the power generation requirements, cooling requirements, emissions requirements, and environmental conditions. For example, a 50 liter engine may be required to generate 1500-2500 kW of electrical power, which requires a certain sized radiator and charge air cooler to cool the engine and intake air in the particular environment and a certain sized exhaust system to mitigate noise and gaseous emissions. The panels are then sized to meet the size of these components.

As shown, the roof panels are modular in length depending on the configuration. The lengths shown include $L_1$ representing the length of the generator compartment portion 735, $L_2$ representing the length of the exhaust portion 740, and $L_3$ representing the length of the engine compartment portion 745. Length $L_4$ represents a modular length of an interior panel of the bulkhead 778.

For example, as shown in FIG. 19 for configuration 810, the engine 770 is a large engine and the generator 772 is appropriately sized and coupled to the engine. To cool the engine 770, a radiator, charge air cooler, or bank of radiators 776 is sized to cool the engine 770 and compressed intake air. As shown, the radiator or bank of radiators 776 is disposed horizontally, while in other embodiments the radiator or bank of radiators 776 is disposed at another angle. For example, the angle may be vertical or between a vertical and a horizontal. Gravity louvers or operable flaps can optionally louvers can optionally be fitted to the exterior of the radiators 776 to prevent water or other environmental intrusion when not operating. Two pairs of fans 760 are used to pressurize the generator compartment 714 to force air through the radiator 776. The bulkhead 778 includes a horizontal panel having length $L_4$ sized to accommodate the overall length of the engine 770 and the generator 772. Furthermore, the length $L_4$ may be selected based on the sizes of the generator 772 and the radiator 776, for example, where the generator and the radiator overlap horizontally. Length $L_1$ is selected to accommodate the length of the radiator 776. Length $L_2$ accommodates the size of the engine compartment 716. Length $L_3$ is not present due to the size of the exhaust system 774.

As a further example, as illustrated in FIG. 20 for configuration 812, the engine 770 is smaller than that in configuration 810. As a result, the generator 772 and the radiator 776 are smaller and have an overall smaller length. The exhaust system 774, however, remains the same size. With the smaller sizes, the bulkhead panel length $L_4$ can be shorter. Other dimensions of the bulkhead 778 may remain the same. This enables the engine 770 to be seated further from the end to gain extra space adjacent the end of the genset 710. The extra space may be used, for example, to store more fuel. Instead of two pairs of fans, one pair of larger fans 760 are used to pressurize the generator compartment 714. Length $L_1$ is shorter to accommodate a shorter radiator 776. Length $L2$ remains the same. However, length $L_3$ is present to extend over the exhaust system 774.

As yet another example, as illustrated in FIG. 21 for configuration 814, the engine 774 is even smaller than that in configuration 812. As a result, the generator 772 and the radiator 776 are even smaller. The exhaust system 774 remains the same size. With the smaller sizes, the bulkhead panel length $L_4$ is no longer present, while the other dimensions of the bulkhead 778 may remain the same. This enables the engine 770 to be seated even further from the end to gain extra space adjacent the end of the genset 710. The size of the fans 760 may be the same or reduced, depending on cooling requirements. Length $L_1$ is shortened further to accommodate the even smaller radiator 776. Length $L_3$ is extended further over the exhaust system 774.

The configurations 810, 812, and 814 are examples of the modular configuration of the genset 710. By packaging the genset 710 into a standard ISO container and establishing modular panels, ease of transporting the genset 710 is facilitated while meeting the requirements of various applications. It is noted that recirculation openings, doors, or gravity louvers (arranged to close when the generator compartment 714 is pressurized and open when in recirculation mode from the engine compartment 716 to the generator compartment 714) can be fitted to the panels between the radiator 776 and the exhaust system 744 to allow for cold weather recirculation operation.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:
1. A system, comprising:
an enclosure from an ambient environment, including:
a generator compartment including a first inlet region and a first outlet region in fluid communication with the ambient environment;
an engine compartment including a second inlet region in fluid communication with the generator compartment and a second outlet region in fluid communication with the ambient environment; and
a bulkhead between the generator and engine compartments to at least substantially fluidly separate the generator and engine compartments;
a radiator in the generator compartment, wherein a pressurized gas in the generator compartment flows along a first gas flow path through the radiator and out of the generator compartment through the first outlet region;
a generator at least partially in the generator compartment, the generator having a second gas flow path through the generator including a generator inlet region opening into the generator compartment and a generator outlet region in fluid communication with the second inlet region;
an engine in the engine compartment, the engine coupled to the radiator for cooling and coupled to the generator to drive the generator.
2. The system of claim 1, in a first modular configuration to accommodate a first size of engine and/or generator, wherein:
the enclosure has a first enclosure length, a first enclosure width and a first enclosure height, and the radiator has a first radiator length, a first radiator thickness and a first radiator height.
3. The system of claim 2, in a second modular configuration to accommodate a second size of engine and/or generator, wherein:

the enclosure has a second enclosure length, the first enclosure width and the first enclosure height, and the radiator has the first radiator length, the first radiator thickness and a second radiator height.

4. The system of claim 3, in a third modular configuration to accommodate a third size of engine and/or generator, wherein:

the enclosure has a third enclosure length, the first enclosure width and the first enclosure height, and the radiator has the first radiator length, the first radiator thickness and a third radiator height.

5. The system of claim 1 and further including an electrical terminal box in the generator compartment and coupled to the generator.

6. The system of claim 5 wherein the terminal box is on an end of the enclosure opposite the generator from the engine.

7. The system of claim 6 wherein the enclosure includes a door on the end to access the electrical terminal box.

8. The system of claim 1 and further including an engine combustion gas intake having an inlet region opening into the generator compartment.

9. The electrical power generation system of claim 1 and further including one or more access doors on the enclosure to provide access to the engine compartment.

10. The system of claim 9 wherein at least one of the access doors is on an end of the engine compartment to provide access to an end of the engine opposite the generator.

11. The electrical power generation system of claim 1, wherein the enclosure is configured to allow the radiator to be varied in size by one or more of a height, a width, and a thickness.

12. The electrical power generation system of claim 1, wherein the enclosure is configured to vary the radiator size in a single dimensional direction selected from of one of height, width, and thickness to fit a range of radiators that varying in size by that single dimensional direction.

13. The electrical power generation system of claim 1, wherein at least one of the generator and the engine compartments is configured to be varied in length by changing one or more of a roof panel, a side panel, a base panel, a base frame member, and a base.

14. The electrical power generation system of claim 1, wherein the enclosure is configured to be varied in height by changing one or more of a side panel, an end panel, an end column, and the bulkhead between the high pressure compartment and the low pressure compartment.

15. The electrical power generation system of claim 1, wherein the enclosure is configured to be varied in width by changing one or more of an end panel, a roof panel, a base, a base panel, and the bulkhead between the high pressure compartment and the low pressure compartment.

16. The electrical power generation system of claim 1, wherein the radiator is mounted at an angle with respect to a base of the enclosure.

17. A system, comprising:

a standard-size ISO enclosure from an ambient environment, including:
  a generator compartment including a first inlet region and a first outlet region in fluid communication with the ambient environment;
  an engine compartment including a second inlet region in fluid communication with the generator compartment and a second outlet region in fluid communication with the ambient environment;
  a bulkhead between the generator and engine compartments to at least substantially fluidly separate the generator and engine compartments;
  a plurality of walls and a roof;
  a plurality of standard-sized openings including a roof opening; and
  at least one modular panel occupying at least a portion of the roof opening;
a radiator in the generator compartment, wherein a pressurized gas in the generator compartment flows along a first gas flow path through the radiator and out of the generator compartment through the first outlet region;
a generator at least partially in the generator compartment, the generator having a second gas flow path through the generator including a generator inlet region opening into the generator compartment and a generator outlet region in fluid communication with the second inlet region;
an engine in the engine compartment, the engine coupled to the radiator for cooling and coupled to the generator to drive the generator.

18. The system of claim 17, wherein the plurality of standard-sized openings includes a plurality of wall openings.

19. The system of claim 18, wherein at least one standard-size panel occupies one of the plurality of wall openings.

20. The system of claim 17, wherein the at least one modular panel is at least partially disposed over the generator compartment.

21. The system of claim 20, wherein the at least one modular panel has a length selected to match a length of the radiator, the length of the radiator selected based on the cooling requirements of the engine.

22. The system of claim 21, wherein the radiator is disposed horizontally in the generator compartment.

23. The system of claim 22, further comprising a bank of radiators including the radiator, the number of radiators in the bank selected based on the cooling requirements of the engine.

24. The system of claim 17, wherein the bulkhead includes a horizontal panel having a length based on the length of the engine and the length of the generator.

25. The system of claim 24, wherein the horizontal panel length is further based on the length of the radiator.

26. The system of claim 17, further including an exhaust system, disposed at least partially over the engine, wherein the at least one modular panel includes an exhaust panel disposed over at least a portion of the exhaust system.

27. The system of claim 17, further including at least one high pressure fan in the generator compartment.

28. The system of claim 27, further including a removable fan rack with the at least one high pressure fan mounted thereto.

29. The system of claim 28, wherein the removable fan rack includes a slidable mount, the generator compartment including rails coupled to the slidable mount.

30. The system of claim 28, wherein the at least one high pressure fan includes a plurality of fans, the number and size of the fans being selected based on the cooling requirements of the engine.

31. The system of claim 17, further including a fuel tank disposed in the engine compartment.

* * * * *